United States Patent
Dazai et al.

(10) Patent No.: US 7,745,098 B2
(45) Date of Patent: Jun. 29, 2010

(54) POLYMER COMPOUND, POSITIVE RESIST COMPOSITION AND METHOD OF FORMING RESIST PATTERN

(75) Inventors: Takahiro Dazai, Kawasaki (JP); Takayoshi Mori, Kawasaki (JP); Hiroaki Shimizu, Kawasaki (JP); Kyoko Ohshita, Kawasaki (JP); Komei Hirahara, Kawasaki (JP)

(73) Assignee: Tokyo Ohka Kogyo Co., Ltd., Kawasaki-shi (JP)

( * ) Notice: Subject to any disclaimer, the term of this patent is extended or adjusted under 35 U.S.C. 154(b) by 0 days.

(21) Appl. No.: 12/198,557

(22) Filed: Aug. 26, 2008

(65) Prior Publication Data

US 2009/0061356 A1   Mar. 5, 2009

(30) Foreign Application Priority Data

Sep. 4, 2007   (JP)   ............................. 2007-229445

(51) Int. Cl.
G03F 7/039 (2006.01)
G03F 7/20 (2006.01)
G03F 7/30 (2006.01)
C08F 220/18 (2006.01)

(52) U.S. Cl. .................... 430/270.1; 430/326; 430/910; 430/921; 430/925; 526/328.5

(58) Field of Classification Search .................... None
See application file for complete search history.

(56) References Cited

U.S. PATENT DOCUMENTS 5,945,517 A    8/1999   Nitta et al.
6,180,313 B1   1/2001   Yukawa et al.
7,074,543 B2   7/2006   Iwai et al.

FOREIGN PATENT DOCUMENTS

JP    H09-208554    8/1997
JP    H11-35551     2/1999
JP    H11-35552     2/1999
JP    H11-35573     2/1999
JP    H11-322707    11/1999
JP    2003-233188 *  8/2003
JP    2003-241385    8/2003
JP    2008-58538  *  3/2008
WO    WO 2004/074242  9/2004

OTHER PUBLICATIONS

Machine-assisted English translation of JP2003-233188 (as provided by JPO).*
English abstract for JP2008-58538 provided by JPO.*

* cited by examiner

*Primary Examiner*—Sin J. Lee
(74) *Attorney, Agent, or Firm*—Knobbe, Martens, Olson & Bear, LLP

(57) ABSTRACT

A polymer compound having a structural unit (a0) represented by a general formula (a0-1) shown below, and a structural unit (a1) that is derived from an acrylate ester containing an acid dissociable, dissolution inhibiting group but is not classified as said structural unit (a0).

[Chemical Formula 1]

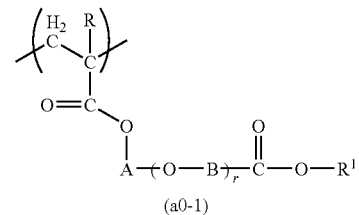

(a0-1)

[wherein, R represents a hydrogen atom, a lower alkyl group, or a halogenated lower alkyl group; A represents a divalent aliphatic cyclic group that may have a substituent; B represents a divalent hydrocarbon group that may have a substituent; r represents an integer of 0 or 1; and R¹ represents an acid dissociable, dissolution inhibiting group]

9 Claims, No Drawings

POLYMER COMPOUND, POSITIVE RESIST COMPOSITION AND METHOD OF FORMING RESIST PATTERN

BACKGROUND OF THE INVENTION

1. Field of the Invention

The present invention relates to a novel polymer compound that can be used as a component of a positive resist composition, a positive resist composition that includes the polymer compound, and a method of forming a resist pattern that uses the positive resist composition.

Priority is claimed on Japanese Patent Application No. 2007-229445, filed Sep. 4, 2007, the content of which is incorporated herein by reference.

2. Description of Related Art

In lithography techniques, for example, a resist film composed of a resist material is formed on a substrate, and the resist film is subjected to selective exposure of radial rays such as light or electron beam through a mask having a predetermined pattern, followed by development, thereby forming a resist pattern having a predetermined shape on the resist film.

A resist material in which the exposed portions become soluble in a developing solution is called a positive-type, and a resist material in which the exposed portions become insoluble in a developing solution is called a negative-type.

In recent years, in the production of semiconductor elements and liquid crystal display elements, advances in lithography techniques have lead to rapid progress in the field of pattern miniaturization.

Typically, these miniaturization techniques involve shortening the wavelength of the exposure light source. Conventionally, ultraviolet radiation typified by g-line and i-line radiation has been used, but nowadays KrF excimer lasers and ArF excimer lasers are starting to be introduced in mass production. Furthermore, research is also being conducted into lithography techniques that use an exposure light source having a wavelength shorter than these excimer lasers, such as $F_2$ excimer lasers, electron beam, extreme ultraviolet radiation (EUV), and X ray.

Resist materials for use with these types of exposure light sources require lithography properties such as a high resolution capable of reproducing patterns of minute dimensions, and a high level of sensitivity to these types of exposure light sources.

As a resist material that satisfies these conditions, a chemically amplified composition is used, which includes a base material component that exhibits a changed solubility in an alkali developing solution under the action of acid and an acid generator that generates acid upon exposure.

For example, as a positive chemically amplified resist composition, a composition containing a resin component (a base resin) that exhibits increased solubility in an alkali developing solution under the action of acid and an acid generator component is commonly used. If the resist film formed using the resist composition is selectively exposed during formation of a resist pattern, then within the exposed portions, acid is generated from the acid generator, and the action of this acid causes an increase in the solubility of the resin component in an alkali developing solution, making the exposed portions soluble in the alkali developing solution.

Resins that contain structural units derived from (meth)acrylate esters within the main chain (acrylic resins) are now widely used as base resins for resists that use ArF excimer laser lithography, as they exhibit excellent transparency in the vicinity of 193 nm (for example, see Japanese Unexamined Patent Application, First Publication No. 2003-241385).

Here, the term "(meth)acrylic acid" is a generic term that includes either or both of acrylic acid having a hydrogen atom bonded to the α-position and methacrylic acid having a methyl group bonded to the α-position. The term "(meth) acrylate ester" is a generic term that includes either or both of the acrylate ester having a hydrogen atom bonded to the α-position and the methacrylate ester having a methyl group bonded to the α-position. The term "(meth)acrylate" is a generic term that includes either or both of the acrylate having a hydrogen atom bonded to the α-position and the methacrylate having a methyl group bonded to the α-position.

SUMMARY OF THE INVENTION

In recent years, the miniaturization of resist patterns has continued to progress, with ever increasing demands for higher levels of resolution for resist materials.

Amongst the expectations for further progress in lithography techniques and an expansion in the potential fields of application, there is considerable demand for novel materials that can be used in lithography applications.

The present invention takes the above circumstances into consideration, and has an object of providing a novel polymer compound that can be used as the resin component of a positive resist composition, a positive resist composition that includes the polymer compound, and a method of forming a resist pattern that uses the positive resist composition.

In order to achieve this object, the present invention adopts the aspects described below.

Namely, a first aspect of the present invention is a polymer compound having a structural unit (a0) represented by General Formula (a0-1) shown below, and a structural unit (a1) that is derived from an acrylate ester containing an acid dissociable, dissolution inhibiting group but is not classified as a structural unit (a0).

[Chemical Formula 1]

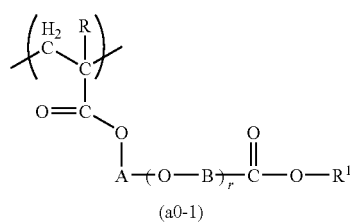

(a0-1)

[wherein, R represents a hydrogen atom, a lower alkyl group, or a halogenated lower alkyl group; A represents a divalent aliphatic cyclic group that may have a substituent; B represents a divalent hydrocarbon group that may have a substituent; r represents an integer of 0 or 1; and $R^1$ represents an acid dissociable, dissolution inhibiting group]

A second aspect of the present invention is a positive resist composition, including a resin component (A) that exhibits increased solubility in an alkali developing solution under the action of acid, and an acid generator component (B) that generates acid upon exposure, wherein the resin component (A) includes a polymer compound (A1) having a structural unit (a0) represented by General Formula (a0-1) shown below, and a structural unit (a1) that is derived from an acrylate ester containing an acid dissociable, dissolution inhibiting group but is not classified as a structural unit (a0).

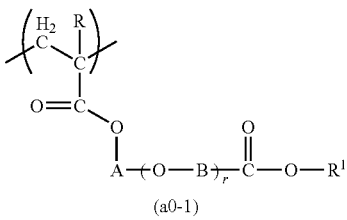

[Chemical Formula 2]

(a0-1)

[wherein, R represents a hydrogen atom, a lower alkyl group, or a halogenated lower alkyl group; A represents a divalent aliphatic cyclic group that may have a substituent; B represents a divalent hydrocarbon group that may have a substituent; r represents an integer of 0 or 1; and $R^1$ represents an acid dissociable, dissolution inhibiting group]

A third aspect of the present invention is a method of forming a resist pattern, including: forming a resist film on a substrate using a positive resist composition of the above-mentioned second aspect of the present invention; conducting exposure of the resist film; and alkali-developing the resist film to form a resist pattern.

In the present description and claims, unless specified otherwise, the term "alkyl group" is deemed to include linear, branched and cyclic, monovalent saturated hydrocarbon groups.

Further, unless specified otherwise, the term "alkylene group" is deemed to include linear, branched and cyclic, divalent saturated hydrocarbon groups.

A "lower alkyl group" is an alkyl group of 1 to 5 carbon atoms.

A "halogenated lower alkyl group" is an alkyl group in which some or all of the hydrogen atoms have been substituted with halogen atoms, wherein examples of the halogen atoms include a fluorine atom, chlorine atom, bromine atom and iodine atom.

The term "structural unit" refers to a monomer unit that contributes to the formation of a polymer compound (a polymer or copolymer).

The term "exposure" is used as a general concept that includes irradiation with any form of radiation.

According to the present invention, there are provided a novel polymer compound that can be used as the resin component for a positive resist composition, a positive resist composition including the polymer compound, and a method of forming a resist pattern using the positive resist composition.

DETAILED DESCRIPTION OF THE INVENTION

Polymer Compound

The polymer compound of the present invention includes a structural unit (a0) represented by General Formula (a0-1) shown above, and a structural unit (a1) that is derived from an acrylate ester containing an acid dissociable, dissolution inhibiting group but is not classified as a structural unit (a0).

<Structural Unit (a0)>

The structural unit (a0) is a structural unit represented by the above General Formula (a0-1).

In General Formula (a0-1), R represents a hydrogen atom, a lower alkyl group, or a halogenated lower alkyl group.

The alkyl group represented by R is preferably a linear or branched alkyl group of 1 to 5 carbon atoms, and specific examples include a methyl group, ethyl group, propyl group, isopropyl group, n-butyl group, isobutyl group, tert-butyl group, pentyl group, isopentyl group and neopentyl group.

The halogenated lower alkyl group represented by R is a group in which some or all of the hydrogen atoms of an above-mentioned lower alkyl group have been substituted with halogen atoms. Examples of the halogen atom include a fluorine atom, chlorine atom, bromine atom and iodine atom, and a fluorine atom is particularly desirable.

As the group R, a hydrogen atom, a lower alkyl group or a fluorinated lower alkyl group is preferred, and in terms of industrial availability, a hydrogen atom or a methyl group is the most desirable.

In Formula (a0-1), A represents a divalent aliphatic cyclic group that may have a substituent.

In the claims and description of the present invention, the term "aliphatic" is a relative concept used in relation to the term "aromatic", and defines a group or compound or the like that has no aromaticity.

The term "aliphatic cyclic group" describes a monocyclic group or polycyclic group that has no aromaticity.

The "aliphatic cyclic group" within the group A may or may not have a substituent. The description that the aliphatic cyclic group may "have a substituent" means that some or all of the hydrogen atoms of the aliphatic cyclic group may be substituted with groups or atoms other than hydrogen atoms. Examples of the substituent include lower alkyl groups of 1 to 5 carbon atoms, lower alkoxy groups of 1 to 5 carbon atoms, a fluorine atom, fluorinated lower alkyl groups of 1 to 5 carbon atoms, and an oxygen atom (=O).

The basic ring structure of the "aliphatic cyclic group" exclusive of substituents is not limited to structures constituted solely from carbon and hydrogen (namely, hydrocarbon groups), but is preferably a hydrocarbon group. Further, the "hydrocarbon group" may be either saturated or unsaturated, but is usually preferably saturated.

The number of carbon atoms in the aliphatic cyclic group of A is preferably within a range from 3 to 20, and is even more preferably from 3 to 12.

When A is a monocyclic group, the monocyclic group is preferably a group in which two or more hydrogen atoms have been removed from a monocycloalkane of 3 to 6 carbon atoms, and specific examples of the monocycloalkane include cyclopentane and cyclohexane.

When A is a polycyclic group, the polycyclic group is preferably a group in which two or more hydrogen atom have been removed from a polycycloalkane of 7 to 12 carbon atoms, and specific examples of the polycycloalkane include adamantane, norbornane, isobornane, tricyclodecane and tetracyclododecane.

Of the above, A is preferably a polycyclic group, is more preferably a group in which two or more hydrogen atoms have been removed from adamantane, is even more preferably a group having no substituents, in which two hydrogen atoms have been removed from adamantane, and is most preferably a group having no substituents, in which hydrogen atoms have been removed from the 1st and 3rd positions of adamantane.

In Formula (a0-1), B represents a divalent hydrocarbon group that may have a substituent.

Examples of the hydrocarbon group represented by B include divalent hydrocarbon groups of two or more carbon atoms that may gave a substituent, and a methylene group that may have a substituent.

The description that the hydrocarbon group may "have a substituent" means that some or all of the hydrogen atoms of the hydrocarbon group may be substituted with groups or atoms other than hydrogen atoms.

The hydrocarbon group may be an aliphatic hydrocarbon group or an aromatic hydrocarbon group.

The term "aliphatic hydrocarbon group" describes a hydrocarbon group that has no aromaticity.

The aliphatic hydrocarbon group of B may be either saturated or unsaturated, but is usually preferably saturated.

More specific examples of the aliphatic hydrocarbon group include linear or branched aliphatic hydrocarbon groups, and aliphatic hydrocarbon groups that contain a ring within their structures.

In the linear or branched aliphatic hydrocarbon group, the number of carbon atoms is preferably within a range from 2 to 10, more preferably from 2 to 8, even more preferably from 2 to 5, and is most preferably 2.

As the linear aliphatic hydrocarbon group, linear alkylene groups are preferred, and specific examples include an ethylene group [—$(CH_2)_2$—], trimethylene group [—$(CH_2)_3$—], tetramethylene group [—$(CH_2)_4$—] and pentamethylene group [—$(CH_2)_5$—].

As the branched aliphatic hydrocarbon group, branched alkylene groups are preferred, and specific examples include various alkylalkylene groups, including alkylmethylene groups such as —$CH(CH_3)$—, —$CH(CH_2CH_3)$—, —$C(CH_3)_2$—, —$C(CH_3)(CH_2CH_3)$—, —$C(CH_3)(CH_2CH_2CH_3)$— and —$C(CH_2CH_3)_2$—; alkylethylene groups such as —$CH(CH_3)CH_2$—, —$CH(CH_3)CH(CH_3)$—, —$C(CH_3)_2CH_2$— and —$CH(CH_2CH_3)CH_2$—; alkyltrimethylene groups such as —$CH(CH_3)CH_2CH_2$— and —$CH_2CH(CH_3)CH_2$—; and alkyltetramethylene groups such as —$CH(CH_3)CH_2CH_2CH_2$— and —$CH_2CH(CH_3)CH_2CH_2$—. The alkyl groups within these alkylalkylene groups are preferably linear alkyl groups of 1 to 5 carbon atoms.

The chain-like aliphatic hydrocarbon groups may or may not have a substituent. Examples of the substituent include a fluorine atom, fluorinated lower alkyl groups of 1 to 5 carbon atoms, and an oxygen atom (=O).

Examples of aliphatic hydrocarbon groups that contain a ring include cyclic aliphatic hydrocarbon groups (groups in which two hydrogen atoms have been removed from an aliphatic hydrocarbon ring), and groups in which this type of cyclic aliphatic hydrocarbon group is either bonded to the terminal of an above-mentioned chain-like aliphatic hydrocarbon group or positioned partway along the chain-like aliphatic hydrocarbon group.

Examples of the cyclic aliphatic hydrocarbon groups include the same groups as those exemplified above in relation to the "aliphatic cyclic group" of the group A.

Examples of the substituent that the methylene group may possess include the same substituents as those exemplified above as possible substituents for the chain-like aliphatic hydrocarbon group.

As the group B, a linear or branched aliphatic hydrocarbon group is preferred, and a methylene group or alkylmethylene group is particularly desirable.

The alkyl group within the alkylmethylene group is preferably a linear alkyl group of 1 to 5 carbon atoms, is even more preferably a linear alkyl group of 1 to 3 carbon atoms, and is most preferably a methyl group.

In Formula (a0-1), r is an integer of 0 or 1, and is preferably 1.

In Formula (a0-1), $R^1$ represents an acid dissociable, dissolution inhibiting group.

The acid dissociable, dissolution inhibiting group is a group which, when the polymer compound of the present invention is added to a positive resist composition together with the acid generator component (B), exhibits acid dissociability and dissociates under the action of the acid generated from the acid generator component (B) upon exposure, but prior to this dissociation, makes the entire polymer compound substantially insoluble in alkali developing solutions.

As the acid-dissociable, dissolution-inhibiting group of $R^1$, any of the groups that have been proposed as acid-dissociable, dissolution-inhibiting groups for the base resins of chemically amplified resists can be used. Generally, groups that form either a cyclic or chain-like tertiary alkyl ester with the carboxyl group of a (meth)acrylic acid; and acetal-type acid dissociable, dissolution inhibiting groups such as alkoxyalkyl groups are widely known. In the present description, the term "(meth)acrylate ester" is a generic term that includes either or both of the acrylate ester having a hydrogen atom bonded to the α-position and the methacrylate ester having a methyl group bonded to the α-position.

Here, a "tertiary alkyl ester" describes a structure in which an ester is formed by substituting the hydrogen atom of a carboxyl group with a chain-like or cyclic tertiary alkyl group, and a tertiary carbon atom within the chain-like or cyclic tertiary alkyl group is bonded to the oxygen atom at the terminal of the carbonyloxy group (—C(O)—O—). In this tertiary alkyl ester, the action of acid causes cleavage of the bond between the oxygen atom and the tertiary carbon atom.

The chain-like or cyclic alkyl group may have a substituent.

Hereafter, for the sake of simplicity, groups that exhibit acid dissociability as a result of the formation of a tertiary alkyl ester with a carboxyl group are referred to as "tertiary alkyl ester-type acid dissociable, dissolution inhibiting groups".

Examples of tertiary alkyl ester-type acid dissociable, dissolution inhibiting groups include aliphatic branched acid dissociable, dissolution inhibiting groups and aliphatic cyclic group-containing acid dissociable, dissolution inhibiting groups.

The term "aliphatic branched" describes a branched structure having no aromaticity.

The structure of the "aliphatic branched acid dissociable, dissolution inhibiting group" is not limited to structures constituted solely of carbon atoms and hydrogen atoms (namely, hydrocarbon groups), but is preferably a hydrocarbon group. Further, the hydrocarbon group may be either saturated or unsaturated, but is usually preferably saturated.

Examples of the aliphatic branched acid dissociable, dissolution inhibiting group include groups represented by a formula —$C(R^{71})(R^{72})(R^{73})$. In this formula, $R^{71}$ to $R^{73}$ each independently represents a linear alkyl group of 1 to 5 carbon atoms. The group represented by —$C(R^{71})(R^{72})(R^{73})$ preferably contains from 4 to 8 carbon atoms, and specific examples include a tert-butyl group, a tert-pentyl group and a tert-heptyl group.

The term "aliphatic cyclic group" refers to a monocyclic group or polycyclic group that has no aromaticity. The number of carbon atoms within the group is preferably within a range from 5 to 30.

The aliphatic cyclic group may or may not have a substituent. Examples of the substituent include lower alkyl groups of 1 to 5 carbon atoms, a fluorine atom, fluorinated lower alkyl groups of 1 to 5 carbon atoms, and an oxygen atom (=O).

The basic ring structure of the aliphatic cyclic group exclusive of substituents is not limited to structures constituted solely from carbon and hydrogen (namely, hydrocarbon groups), but is preferably a hydrocarbon group. Further, the "hydrocarbon group" may be either saturated or unsaturated, but is usually preferably saturated.

The aliphatic cyclic group is preferably a polycyclic group.

Examples of the aliphatic cyclic group include groups in which one or more hydrogen atoms have been removed from a monocycloalkane or a polycycloalkane such as a bicycloalkane, tricycloalkane or tetracycloalkane, which may or may not be substituted with a lower alkyl group, a fluorine atom or a fluorinated alkyl group. More specific examples include groups in which one or more hydrogen atoms have been removed from either a monocycloalkane such as cyclopentane or cyclohexane, or a polycycloalkane such as adamantane, norbornane, isobornane, dicyclodecane, tricyclodecane or tetracyclododecane.

Examples of aliphatic cyclic group-containing acid dissociable, dissolution inhibiting groups include (i) groups having a tertiary carbon atom within the ring structure of a monovalent aliphatic cyclic group; and (ii) groups having a monovalent aliphatic cyclic group, and a branched alkylene group containing a tertiary carbon atom bonded to the aliphatic cyclic group.

(i) Specific examples of groups having a tertiary carbon atom within the ring structure of a monovalent aliphatic cyclic group include groups represented by General Formulas (1-1) to (1-9) shown below.

(ii) Specific examples of groups having a monovalent aliphatic cyclic group, and a branched alkylene group containing a tertiary carbon atom bonded to the aliphatic cyclic group include groups represented by General Formulas (2-1) to (2-6) shown below.

[Chemical Formula 3]

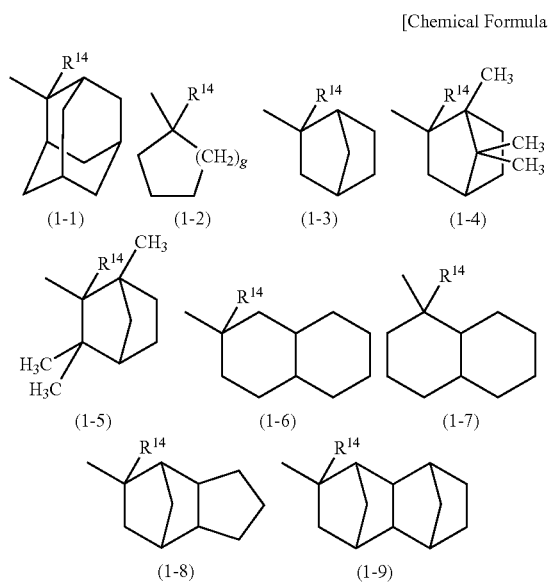

[wherein, $R^{14}$ represents a lower alkyl group, and g represents an integer of 0 to 8]

[Chemical Formula 4]

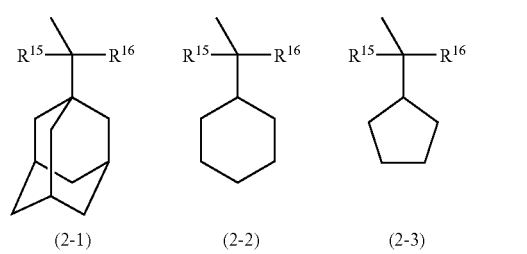

-continued

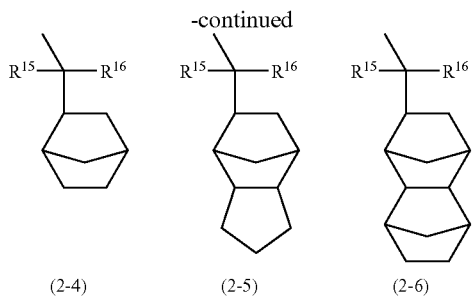

[wherein, $R^{15}$ and $R^{16}$ each independently represents an alkyl group]

As the alkyl groups of $R^{14}$ to $R^{16}$, lower alkyl groups are preferred, and linear or branched alkyl groups are particularly desirable. Specific examples include a methyl group, ethyl group, propyl group, isopropyl group, n-butyl group, isobutyl group, tert-butyl group, pentyl group, isopentyl group and neopentyl group. Of these, a methyl group, ethyl group or n-butyl group is preferred, and a methyl group or ethyl group is particularly desirable.

g is preferably an integer of 0 to 3, more preferably an integer of 1 to 3, even more preferably either 1 or 2, and is most preferably 2.

An "acetal-type acid dissociable, dissolution inhibiting group" generally substitutes a hydrogen atom at the terminal of an alkali-soluble group such as a carboxyl group or hydroxyl group, and is therefore bonded to an oxygen atom. When acid is generated upon exposure, the action of this acid breaks the bond between the acetal-type acid dissociable, dissolution inhibiting group and the oxygen atom to which the acetal-type, acid dissociable, dissolution inhibiting group is bonded.

Examples of acetal-type acid dissociable, dissolution inhibiting groups include groups represented by General Formula (p1) shown below.

[Chemical Formula 5]

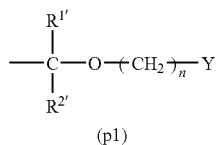

[wherein $R^{1'}$ and $R^{2'}$ each independently represents a hydrogen atom or a lower alkyl group; n represents an integer of 0 to 3; and Y represents a lower alkyl group or an aliphatic cyclic group]

In the above formula, n is preferably an integer of 0 to 2, more preferably 0 or 1, and is most preferably 0.

Examples of the lower alkyl group for $R^{1'}$ and $R^{2'}$ include the same lower alkyl groups as those exemplified above for R in General Formula (a0-1), although a methyl group or ethyl group is preferred, and a methyl group is particularly desirable.

In the present invention, it is preferable that at least one of $R^{1'}$ and $R^{2'}$ is a hydrogen atom. That is, it is preferable that the acid dissociable, dissolution inhibiting group (p1) is a group represented by General Formula (p1-1) shown below.

[Chemical Formula 6]

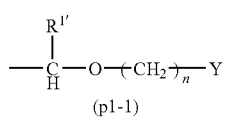

(p1-1)

[wherein $R^{1\prime}$, n and Y are as defined above]

Examples of the lower alkyl group represented by Y include the same lower alkyl groups as those exemplified above for R in General Formula (a0-1).

As the aliphatic cyclic group represented by Y, any of the monocyclic or polycyclic aliphatic cyclic groups that have been proposed for conventional ArF resists and the like can be appropriately selected for use. Examples include the same groups described above in relation to the "aliphatic cyclic group".

Further, examples of the acetal-type, acid dissociable, dissolution inhibiting group include groups represented by General Formula (p2) shown below.

[Chemical Formula 7]

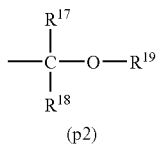

(p2)

[wherein $R^{17}$ and $R^{18}$ each independently represents a linear or branched alkyl group or a hydrogen atom; and $R^{19}$ represents a linear, branched or cyclic alkyl group; or alternatively, $R^{17}$ and $R^{19}$ each independently represents a linear or branched alkylene group, wherein the terminal of $R^{17}$ is bonded to the terminal of $R^{19}$ to form a ring]

The alkyl group for $R^{17}$ and $R^{18}$ preferably has 1 to 15 carbon atoms, may be either linear or branched, is preferably an ethyl group or methyl group, and is most preferably a methyl group.

It is particularly desirable that one of $R^{17}$ and $R^{18}$ is a hydrogen atom and the other is a methyl group.

$R^{19}$ represents a linear, branched or cyclic alkyl group, which preferably has 1 to 15 carbon atoms, and may be any of linear, branched or cyclic.

When $R^{19}$ represents a linear or branched alkyl group, it is preferably an alkyl group of 1 to 5 carbon atoms, more preferably an ethyl group or methyl group, and is most preferably an ethyl group.

When $R^{19}$ represents a cyclic group, the group preferably contains 4 to 15 carbon atoms, more preferably 4 to 12 carbon atoms, and most preferably 5 to 10 carbon atoms. Examples of the cyclic alkyl group include groups in which one or more hydrogen atoms have been removed from a monocycloalkane or a polycycloalkane such as a bicycloalkane, tricycloalkane or tetracycloalkane, which may or may not be substituted with a fluorine atom or a fluorinated alkyl group. Specific examples include groups in which one or more hydrogen atoms have been removed from either a monocycloalkane such as cyclopentane or cyclohexane, or a polycycloalkane such as adamantane, norbornane, isobornane, tricyclodecane or tetracyclododecane. Of these, a group in which one or more hydrogen atoms have been removed from adamantane is preferred.

In the above formula, $R^{17}$ and $R^{19}$ may each independently represent a linear or branched alkylene group (preferably an alkylene group of 1 to 5 carbon atoms), wherein the terminal of $R^{19}$ is bonded to the terminal of $R^{17}$.

In such a case, a cyclic group is formed by $R^{17}$, $R^{19}$, the oxygen atom bonded to $R^{19}$, and the carbon atom that is bonded to the oxygen atom and $R^{17}$. Such a cyclic group is preferably a 4- to 7-membered ring, and more preferably a 4- to 6-membered ring. Specific examples of the cyclic group include a tetrahydropyranyl group and a tetrahydrofuranyl group.

Specific examples of the acetal-type acid dissociable, dissolution inhibiting group include groups represented by Formulas (3-1) to (3-12) shown below.

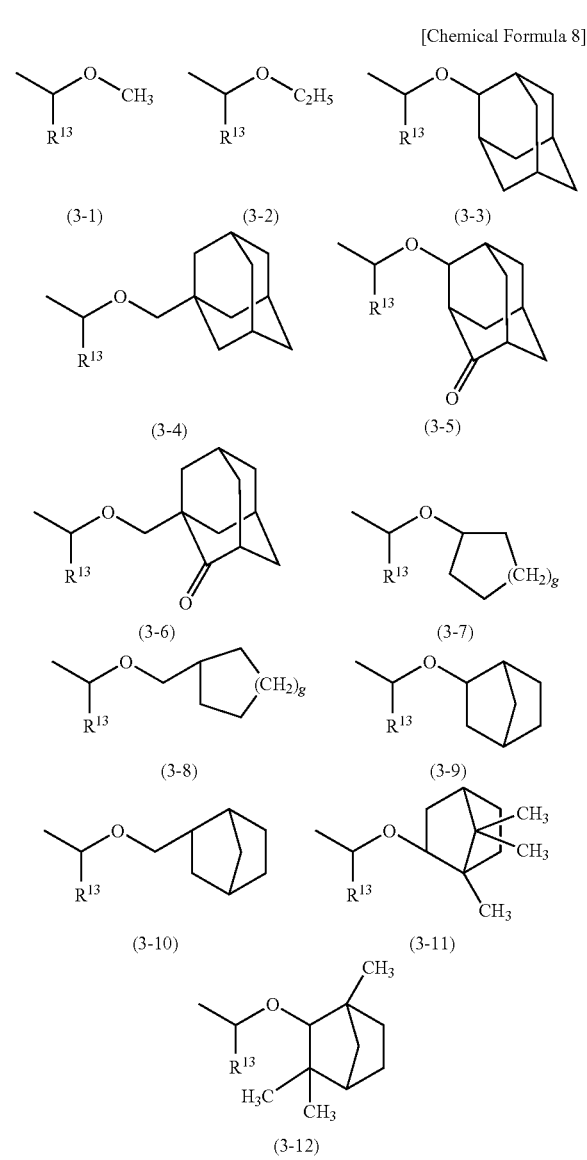

[wherein $R^{13}$ represents a hydrogen atom or a methyl group, and g is as defined above]

In the present invention, $R^1$ in the above General Formula (a0-1) is preferably a tertiary alkyl ester-type acid dissociable, dissolution inhibiting group, is more preferably an above-mentioned (i) group having a tertiary carbon atom within the ring structure of a monovalent aliphatic cyclic group, and of these groups, is most preferably a group represented by General Formula (1-2).

As the structural unit (a0-1), structural units represented by General Formula (a0-1-1) shown below are particularly desirable.

[Chemical Formula 9]

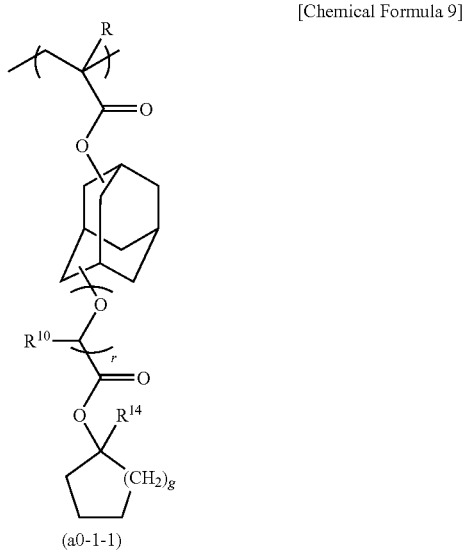

(a0-1-1)

[wherein, R, r, $R^{14}$ and g are as defined above, and $R^{10}$ represents a hydrogen atom or a methyl group]

In General Formula (a0-1-1), R is as defined above for the group R in General Formula (a0-1).

r is preferably 1.

The lower alkyl group represented by $R^{14}$ is as defined for the lower alkyl group represented by R in General Formula (a0-1), is preferably a methyl group or ethyl group, and is most preferably an ethyl group.

g is preferably an integer of 1 to 3, is more preferably either 1 or 2, and is most preferably 2.

$R^{10}$ is preferably a methyl group.

In the adamantane structure, the bonding position for the oxygen at the terminal of the carbonyloxy group (—C(O)—O—) that is bonded at the α-position of the structural unit is preferably the 1st position on the adamantane ring. Further, the bonding position for the oxygen atom at the terminal of the —(O—C($R^{10}$))$_r$— group is preferably the 3rd position on the adamantane ring.

The structural unit (a0) contained within the polymer compound of the present invention may be either a single type or a combination of two or more types.

In the polymer compound of the present invention, the amount of the structural unit (a0) is set such that the combined amount of the structural unit (a0) and the structural unit (a1) described below, relative to the total of all the structural units that constitute the polymer compound, is preferably within a range from 10 to 80 mol %, even more preferably from 20 to 70 mol %, and is most preferably from 25 to 50 mol %. By making the amount of the structural unit (a0) at least as large as the lower limit of the above-mentioned range, a pattern can be formed easily when a resist composition is prepared, whereas by making the amount no more than the upper limit of the above-mentioned range, a good balance can be achieved with the other structural units.

Further, the mixing ratio between the structural unit (a0) and the structural unit (a1) described below [(a0):(a1)], reported as a weight ratio, is preferably such that (a0):(a1)= 9:1 to 1:9, is even more preferably from 8:2 to 2:8, and is most preferably from 7:3 to 3:7.

<Structural Unit (a1)>

The structural unit (a1) is a structural unit that is derived from an acrylate ester containing an acid dissociable, dissolution inhibiting group but is not classified as a structural unit (a0).

Examples of the acid dissociable, dissolution inhibiting group in the structural unit (a1) include the same groups as those exemplified above for the acid dissociable, dissolution inhibiting group represented by $R^1$ in General Formula (a0-1).

In the present descriptions and the claims, the term "structural unit derived from an acrylate ester" refers to a structural unit that is formed by the cleavage of the ethylenic double bond of an acrylate ester.

The term "acrylate ester" is a generic term that includes the acrylate ester having a hydrogen atom bonded to the carbon atom on the α-position, and acrylate esters having a substituent (an atom other than a hydrogen atom or a group) bonded to the carbon atom on the α-position. As the substituent, a lower alkyl group or a halogenated lower alkyl group can be mentioned.

In the structural unit derived from an acrylate ester, the α-position (the carbon atom on the α-position) refers to the carbon atom having the carbonyl group bonded thereto, unless specified otherwise.

With respect to the acrylate ester, specific examples of the lower alkyl group that may functions as the substituent at the α-position include linear or branched lower alkyl groups such as a methyl group, ethyl group, propyl group, isopropyl group, n-butyl group, isobutyl group, tert-butyl group, pentyl group, isopentyl group, and neopentyl group.

In the present invention, it is preferable that a hydrogen atom, a lower alkyl group or a halogenated lower alkyl group, and more preferably a hydrogen atom, a lower alkyl group or a fluorinated lower alkyl group, is bonded to the α-position of the acrylate ester. In terms of industrial availability, a hydrogen atom or a methyl group is particularly desirable.

As the structural unit (a1), at least one structural unit selected from the group consisting of structural units represented by General Formula (a1-0-1) shown below and structural units represented by General Formula (a1-0-2) shown below is preferred.

[Chemical Formula 10]

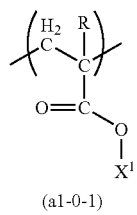

(a1-0-1)

[wherein, R represents a hydrogen atom, a lower alkyl group or a halogenated lower alkyl group; and $X^1$ represents an acid dissociable, dissolution inhibiting group]

[Chemical Formula 11]

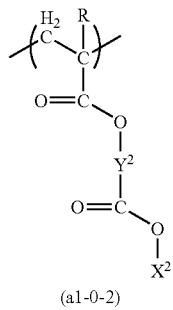

(a1-0-2)

[wherein R represents a hydrogen atom, a lower alkyl group or a halogenated lower alkyl group; $X^2$ represents an acid dissociable, dissolution inhibiting group; and $Y^2$ represents an alkylene group]

In General Formula (a1-0-1), the lower alkyl group and halogenated lower alkyl group represented by R are as defined above for R in General Formula (a0-1).

$X^1$ is not particularly limited as long as it is an acid dissociable, dissolution inhibiting group, and examples include the aforementioned tertiary alkyl ester-type acid dissociable, dissolution inhibiting groups and acetal-type acid dissociable, dissolution inhibiting groups, and of these, tertiary alkyl ester-type acid dissociable, dissolution inhibiting groups are preferred.

In General Formula (a1-0-2), R is as defined above for the group R in General Formula (a0-1).

$X^2$ is the same as $X^1$ in General Formula (a1-0-1).

$Y^2$ is preferably an alkylene group of 1 to 10 carbon atoms.

When $Y^2$ is an alkylene group of 1 to 10 carbon atoms, the number of carbon atoms is preferably within a range from 1 to 6, more preferably from 1 to 4, and is most preferably from 1 to 3.

Specific examples of the structural unit (a1) include structural units represented by General Formulas (a1-1) to (a1-4) shown below.

[Chemical Formula 12]

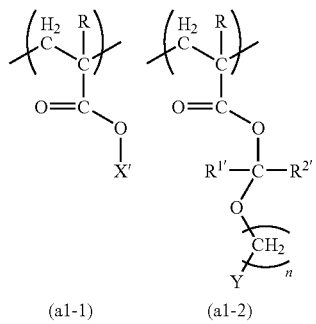

(a1-1)    (a1-2)    (a1-3)

-continued

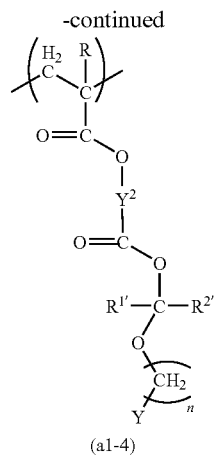

(a1-4)

[wherein X' represents a tertiary alkyl ester-type acid dissociable, dissolution inhibiting group; Y represents a lower alkyl group of 1 to 5 carbon atoms or an aliphatic cyclic group; n represents an integer of 0 to 3; $Y^2$ is as defined above; R is as defined above; and $R^{1'}$ and $R^{2'}$ each independently represents a hydrogen atom or a lower alkyl group of 1 to 5 carbon atoms]

In the above formulas, examples of X' include the same tertiary alkyl ester-type acid dissociable, dissolution inhibiting groups as those exemplified above for $X^1$.

Examples of $R^{1'}$, $R^{2'}$, n and Y include the same groups as those exemplified above for $R^{1'}$, $R^{2'}$, n and Y in General Formula (p1) within the above description of acetal-type acid dissociable, dissolution inhibiting groups.

Examples of $Y^2$ includes the same groups as those exemplified above for $Y^2$ in the above General Formula (a1-0-2).

Specific examples of structural units represented by the above General Formulas (a1-1) to (a1-4) are shown below.

[Chemical Formula 13]

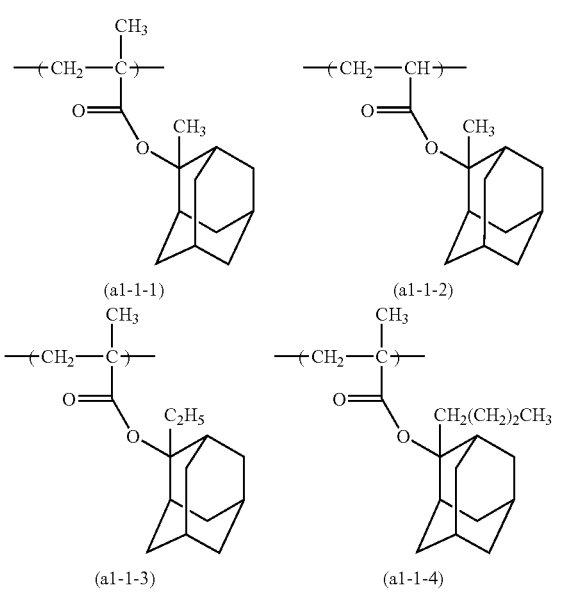

(a1-1-1)    (a1-1-2)

(a1-1-3)    (a1-1-4)

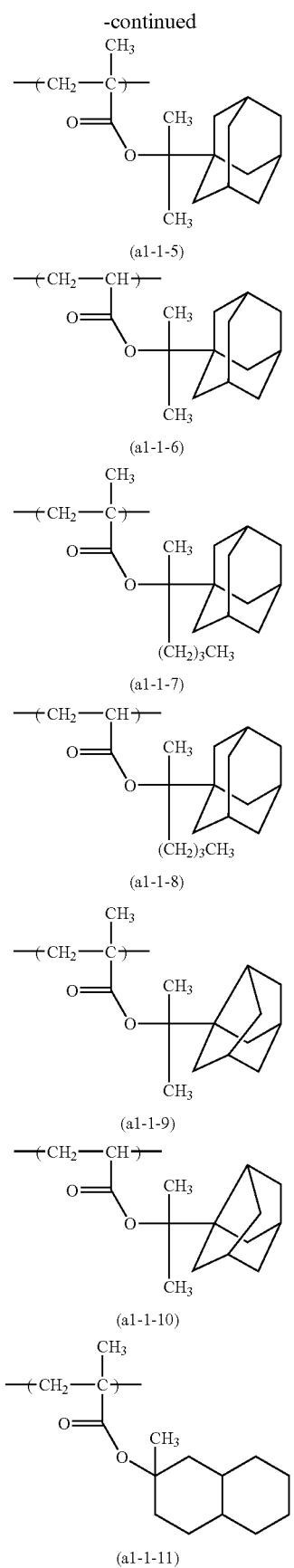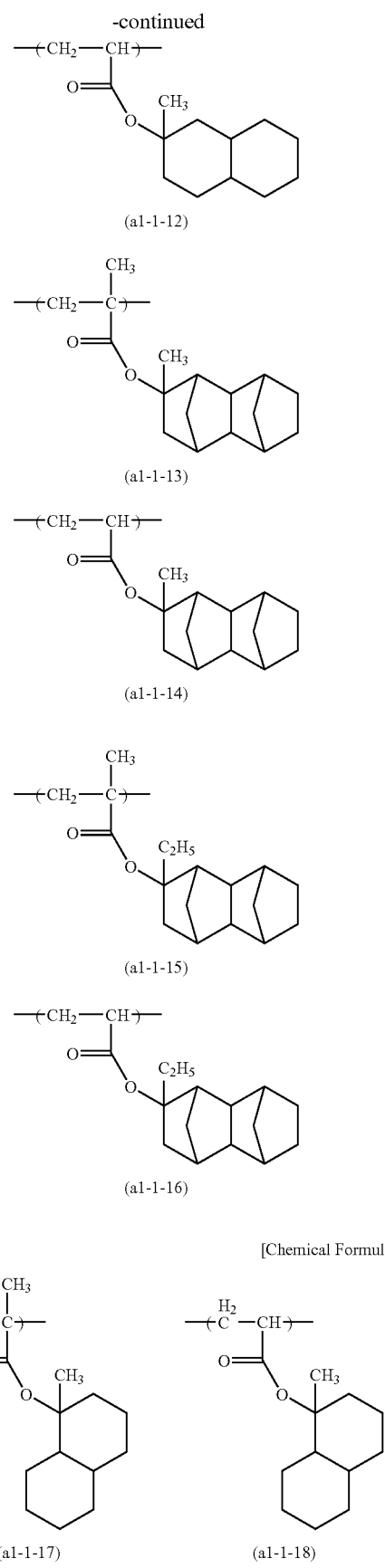

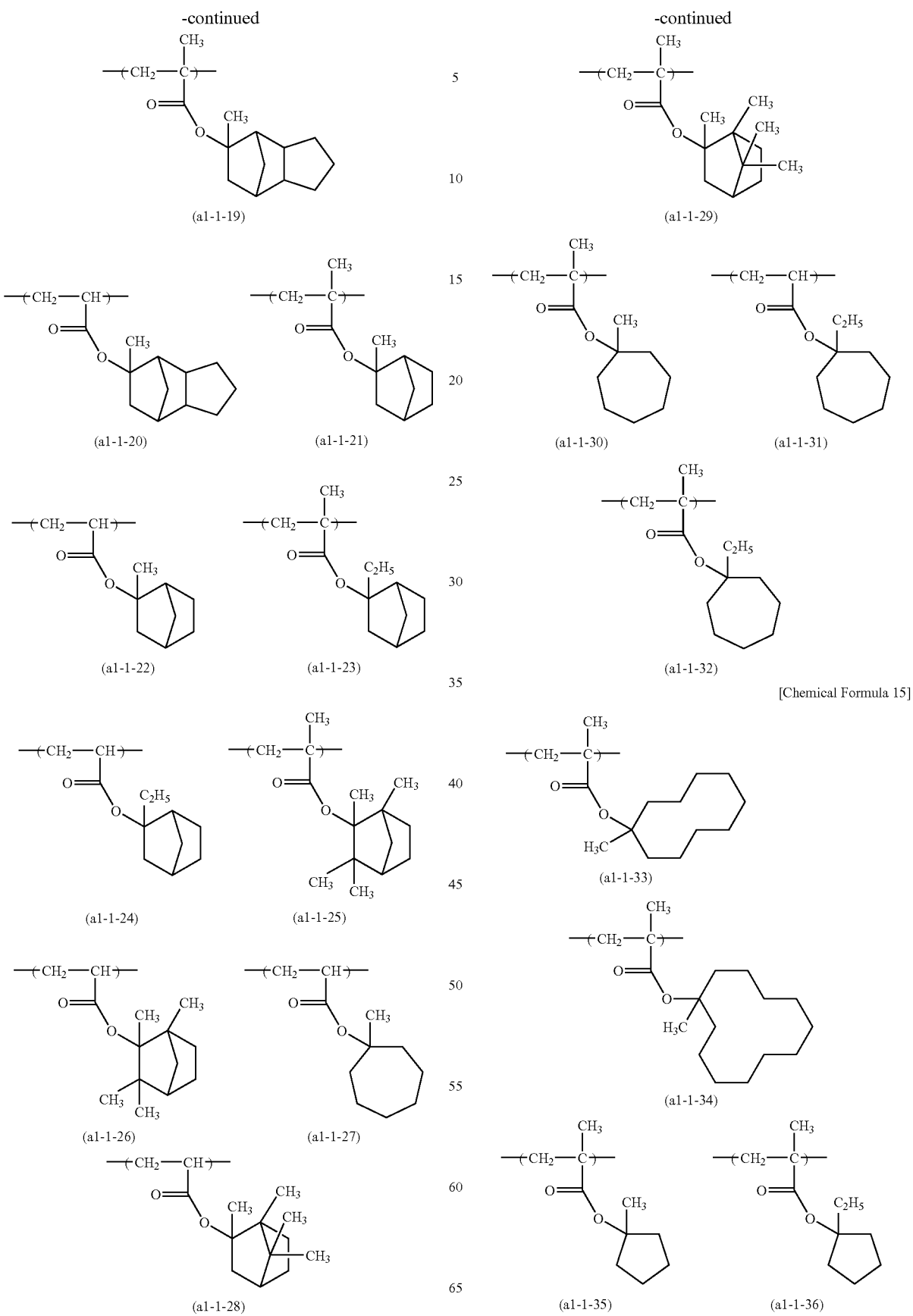

-continued
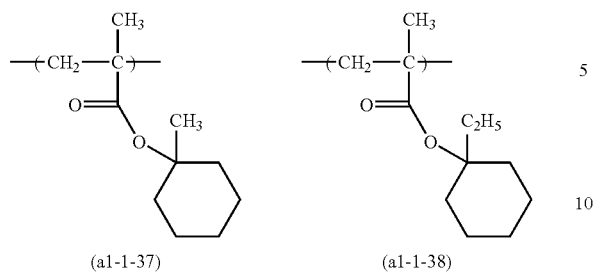
(a1-1-37)   (a1-1-38)
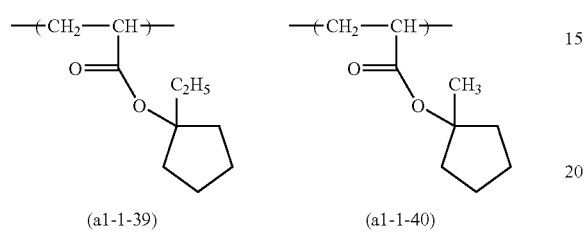
(a1-1-39)   (a1-1-40)
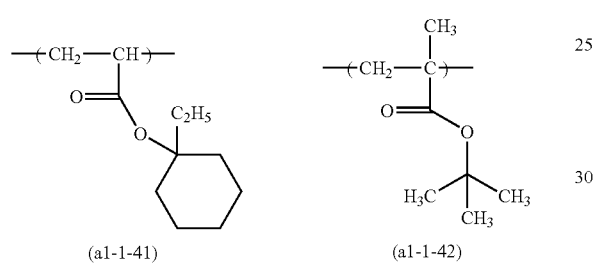
(a1-1-41)   (a1-1-42)
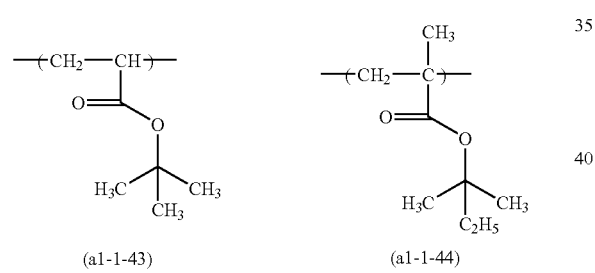
(a1-1-43)   (a1-1-44)
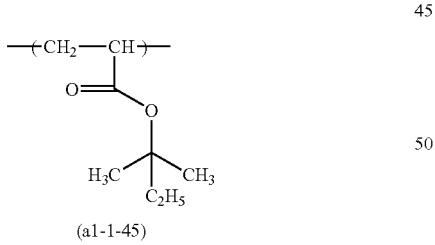
(a1-1-45)
[Chemical Formula 16]
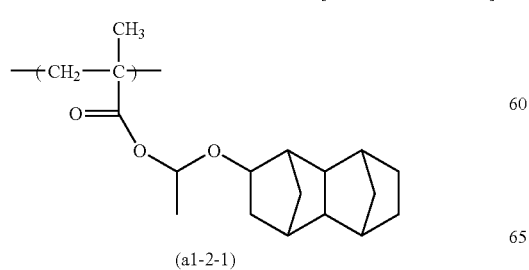
(a1-2-1)
-continued
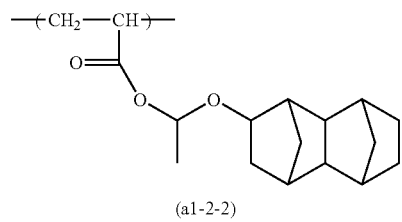
(a1-2-2)
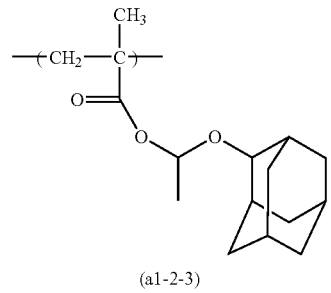
(a1-2-3)
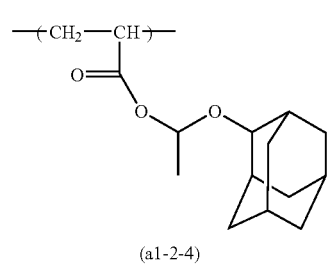
(a1-2-4)
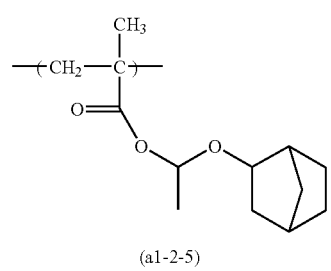
(a1-2-5)
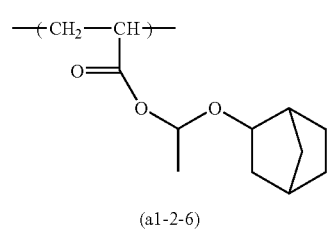
(a1-2-6)
[Chemical Formula 17]
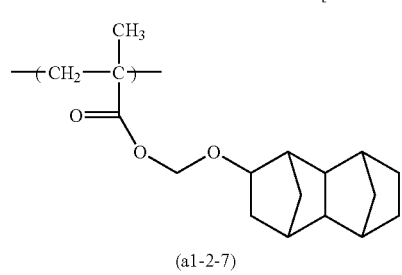
(a1-2-7)

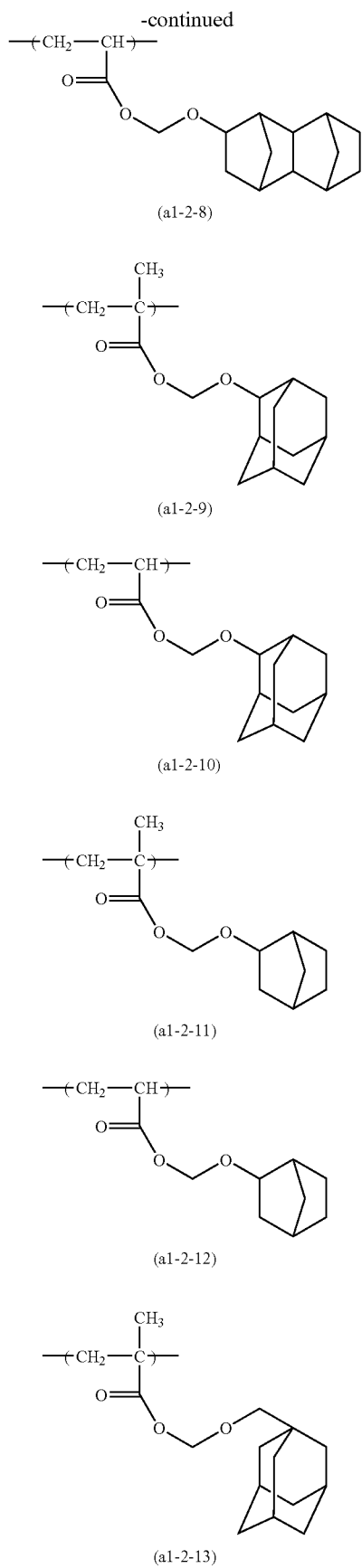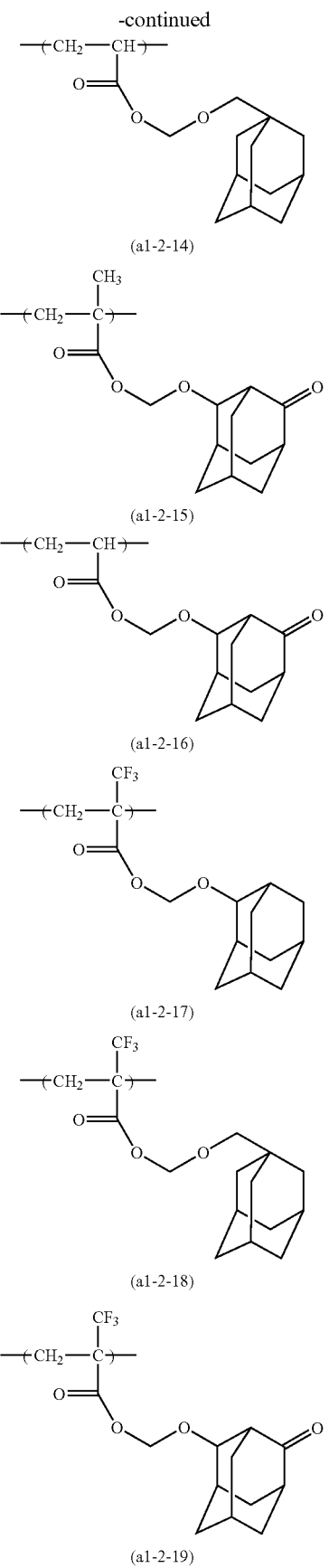

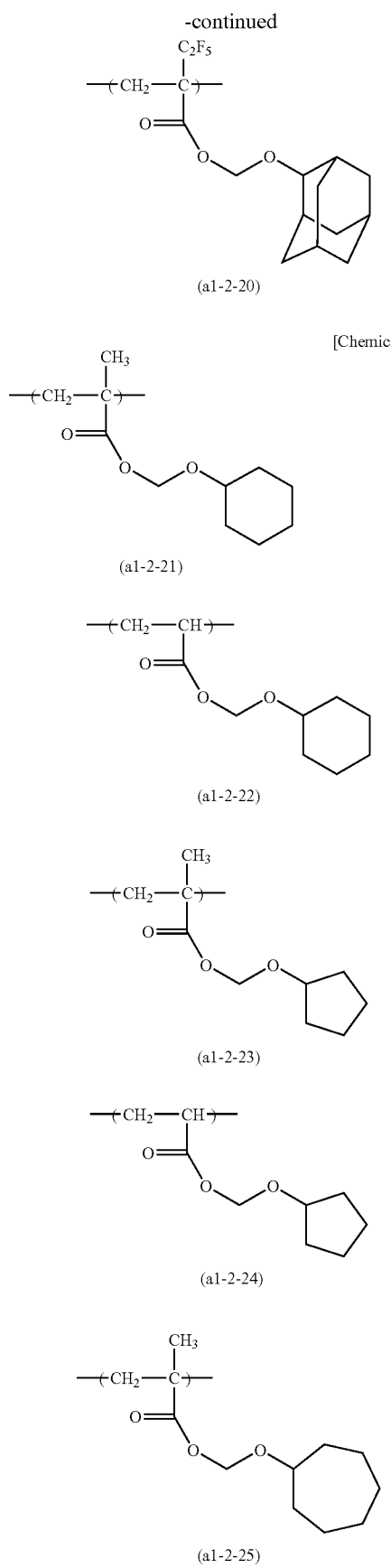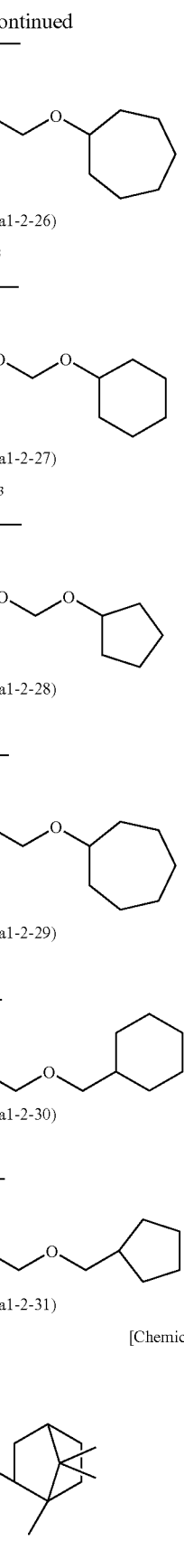

-continued
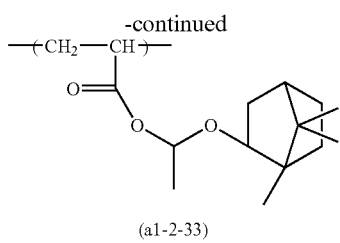
(a1-2-33)
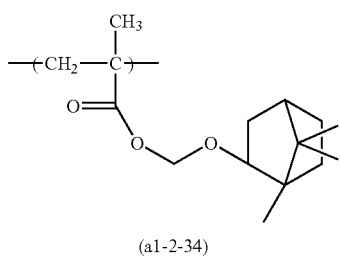
(a1-2-34)
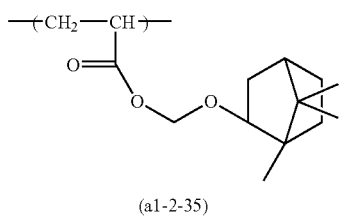
(a1-2-35)
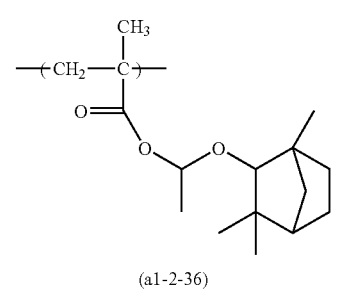
(a1-2-36)
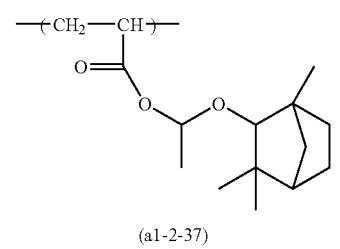
(a1-2-37)
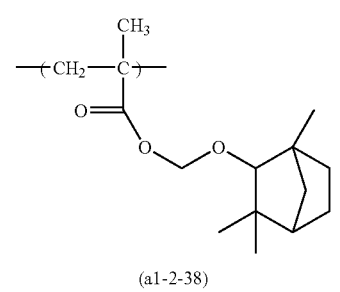
(a1-2-38)
-continued
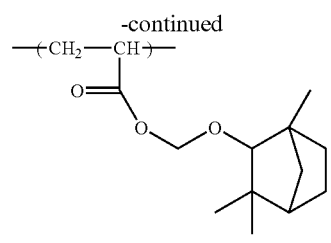
(a1-2-39)
[Chemical Formula 20]
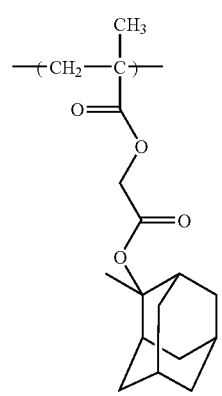 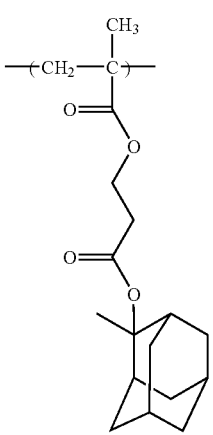
(a1-3-1)          (a1-3-2)
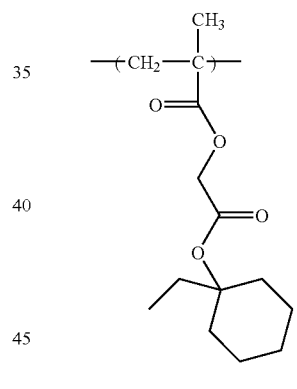
(a1-3-3)          (a1-3-4)
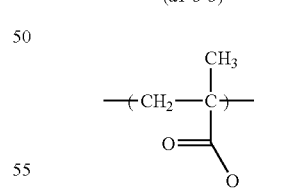
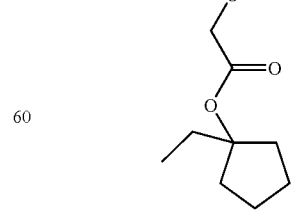
(a1-3-5)          (a1-3-6)

-continued

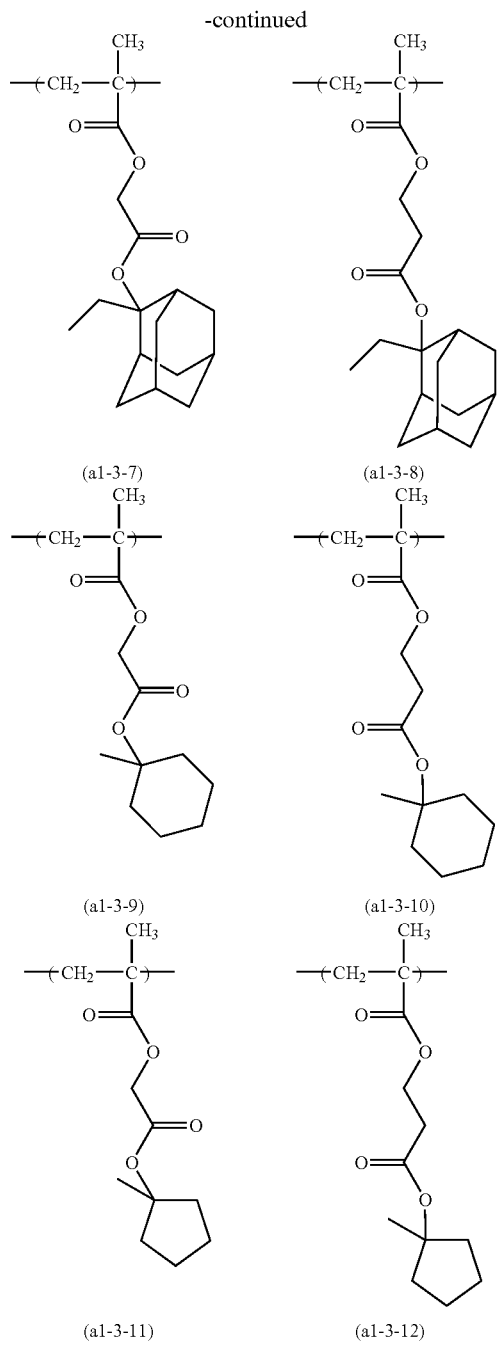

Of the above, structural units represented by General Formula (a1-1) are preferable. More specifically, at least one structural unit selected from the group consisting of structural units represented by Formulas (a1-1-1) to (a-1-1-6) and Formulas (a1-1-35) to (a1-1-41) is more preferable.

Further, as the structural unit (a1), structural units represented by General Formula (a1-1-01) shown below, which includes the structural units represented by Formulas (a1-1-1) to (a1-1-4), and structural units represented by General Formula (a1-1-02) shown below, which includes the structural units represented by Formulas (a1-1-35) to (a1-1-41) are also preferable, and structural units represented by General Formula (a1-1-01) shown below are particularly desirable.

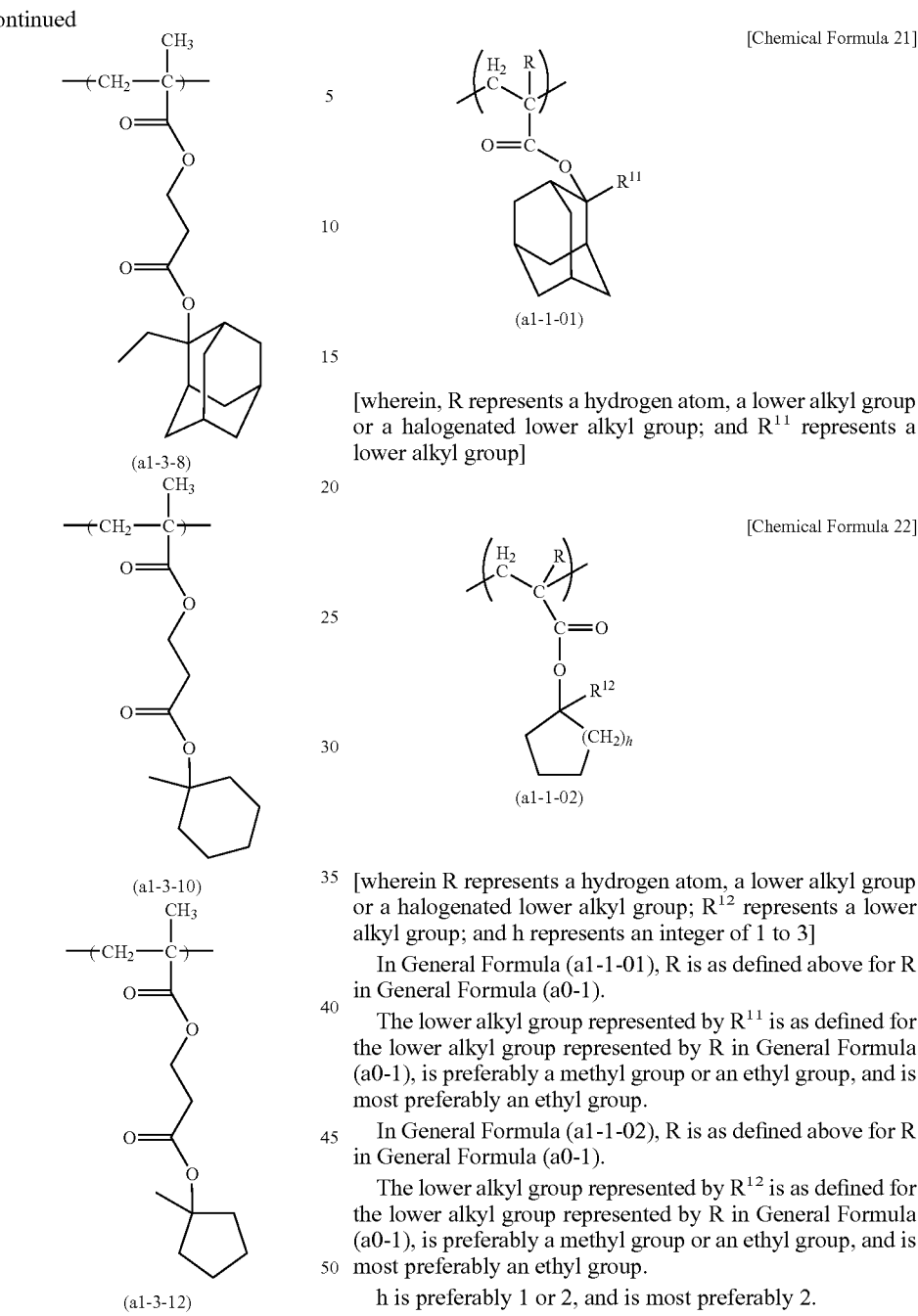

[Chemical Formula 21]

(a1-1-01)

[wherein, R represents a hydrogen atom, a lower alkyl group or a halogenated lower alkyl group; and $R^{11}$ represents a lower alkyl group]

[Chemical Formula 22]

(a1-1-02)

[wherein R represents a hydrogen atom, a lower alkyl group or a halogenated lower alkyl group; $R^{12}$ represents a lower alkyl group; and h represents an integer of 1 to 3]

In General Formula (a1-1-01), R is as defined above for R in General Formula (a0-1).

The lower alkyl group represented by $R^{11}$ is as defined for the lower alkyl group represented by R in General Formula (a0-1), is preferably a methyl group or an ethyl group, and is most preferably an ethyl group.

In General Formula (a1-1-02), R is as defined above for R in General Formula (a0-1).

The lower alkyl group represented by $R^{12}$ is as defined for the lower alkyl group represented by R in General Formula (a0-1), is preferably a methyl group or an ethyl group, and is most preferably an ethyl group.

h is preferably 1 or 2, and is most preferably 2.

In the polymer compound of the present invention, the structural unit (a1) may be either a single type or a combination of two or more types.

In those cases where the polymer compound of the present invention is a copolymer including other structural units besides the structural unit (a0) and the structural unit (a1), there are no particular limitations on the other structural units, and any of the structural units that have been used within the base resins of conventional chemically amplified resists may be used.

Specific examples of these other structural units include structural units (a2) to (a4) described below.

Of these, the polymer compound of the present invention preferably includes the structural unit (a2) in addition to the structural unit (a0) and the structural unit (a1).

Further, the polymer compound of the present invention preferably includes the structural unit (a3), either in addition to the structural unit (a0) and the structural unit (a1), or in addition to the structural unit (a0), the structural unit (a1) and the structural unit (a2).

<Structural Unit (a2)>

The structural unit (a2) is a structural unit derived from an acrylate ester that contains a lactone-containing cyclic group.

Here, the term "lactone-containing cyclic group" refers to a cyclic group including one ring containing a —O—C(O)— structure (a lactone ring). The lactone ring is counted as the first ring, and a group in which the only ring structure is the lactone ring is referred to as a monocyclic group, whereas a group containing another additional ring structure is described as a polycyclic group regardless of the structure of the other ring.

When the polymer compound of the present invention is used for forming a resist film, the lactone-containing cyclic group of the structural unit (a2) is effective in improving the adhesion between the resist film and the substrate, and increasing the compatibility with the developing solution containing water.

As the structural unit (a2), there are no particular limitations, and an arbitrary structural unit may be used.

Specific examples of lactone-containing monocyclic groups include groups in which one hydrogen atom has been removed from γ-butyrolactone. Further, specific examples of lactone-containing polycyclic groups include groups in which one hydrogen atom has been removed from a lactone ring-containing bicycloalkane, tricycloalkane or tetracycloalkane.

Specific examples of the structural unit (a2) include structural units represented by General Formulas (a2-1) to (a2-5) shown below.

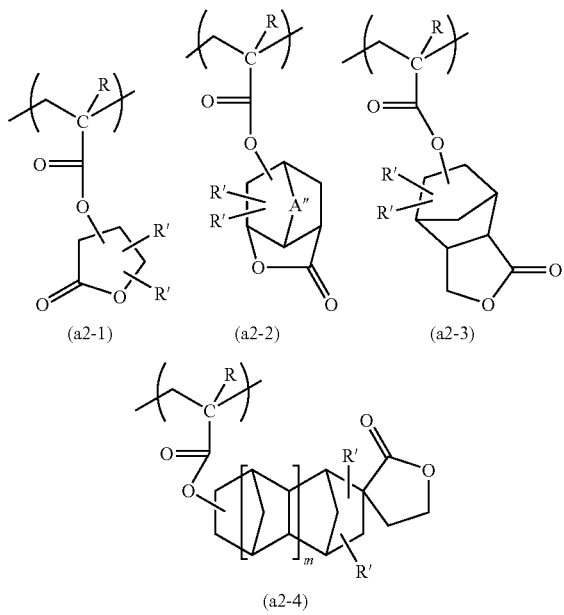

[Chemical Formula 23]

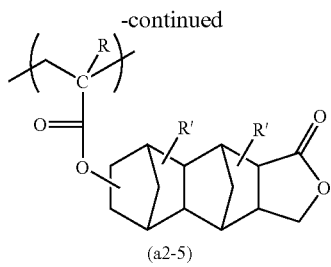

[wherein R represents a hydrogen atom, a lower alkyl group or a halogenated lower alkyl group; R' represents a hydrogen atom, a lower alkyl group, an alkoxy group of 1 to 5 carbon atoms or a —COOR" group; R" represents a hydrogen atom or a linear, branched or cyclic alkyl group of 1 to 15 carbon atoms; m represents an integer of either 0 or 1; and A" represents an alkylene group of 1 to 5 carbon atoms or an oxygen atom]

The group R in General Formulas (a2-1) to (a2-5) is as defined above for R in General Formula (a0-1).

The lower alkyl group represented by R' is as defined above for the lower alkyl group represented by R in General Formula (a0-1). In General Formulas (a2-1) to (a2-5), considering factors such as industrial availability, R' is preferably a hydrogen atom.

When R" represents a linear or branched alkyl group, it preferably contains 1 to 10 carbon atoms, and more preferably 1 to 5 carbon atoms.

When R" represents a cyclic alkyl group, it preferably contains 3 to 15 carbon atoms, more preferably 4 to 12 carbon atoms, and most preferably 5 to 10 carbon atoms. Examples of the cyclic alkyl group include groups in which one or more hydrogen atoms have been removed from a monocycloalkane or a polycycloalkane such as a bicycloalkane, tricycloalkane or tetracycloalkane, which may or may not be substituted with a fluorine atom or a fluorinated alkyl group. Specific examples include groups in which one or more hydrogen atoms have been removed from a monocycloalkane such as cyclopentane or cyclohexane, and groups in which one or more hydrogen atoms have been removed from a polycycloalkane such as adamantane, norbornane, isobornane, tricyclodecane or tetracyclododecane.

Specific examples of the alkylene group of 1 to 5 carbon atoms represented by A" include a methylene group, ethylene group, n-propylene group and isopropylene group.

Specific examples of structural units of General Formulas (a2-1) to (a2-5) are shown below.

[Chemical Formula 24]

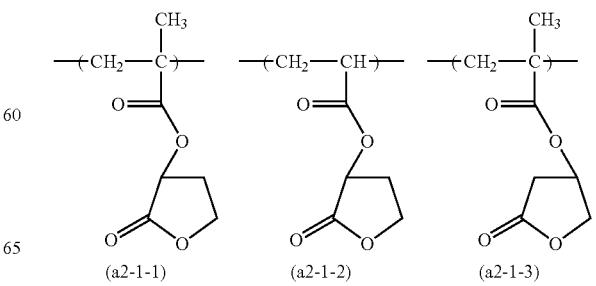

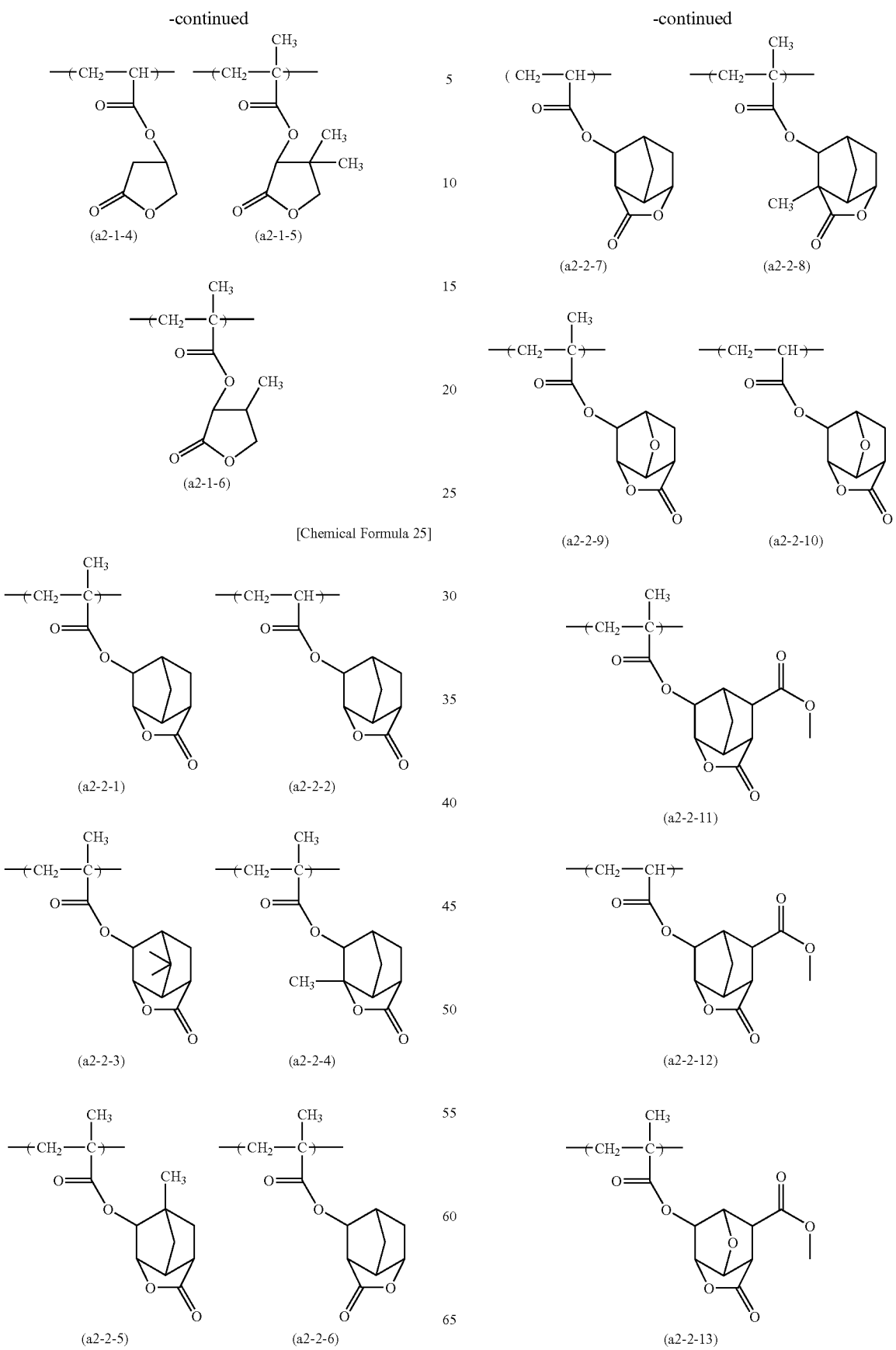

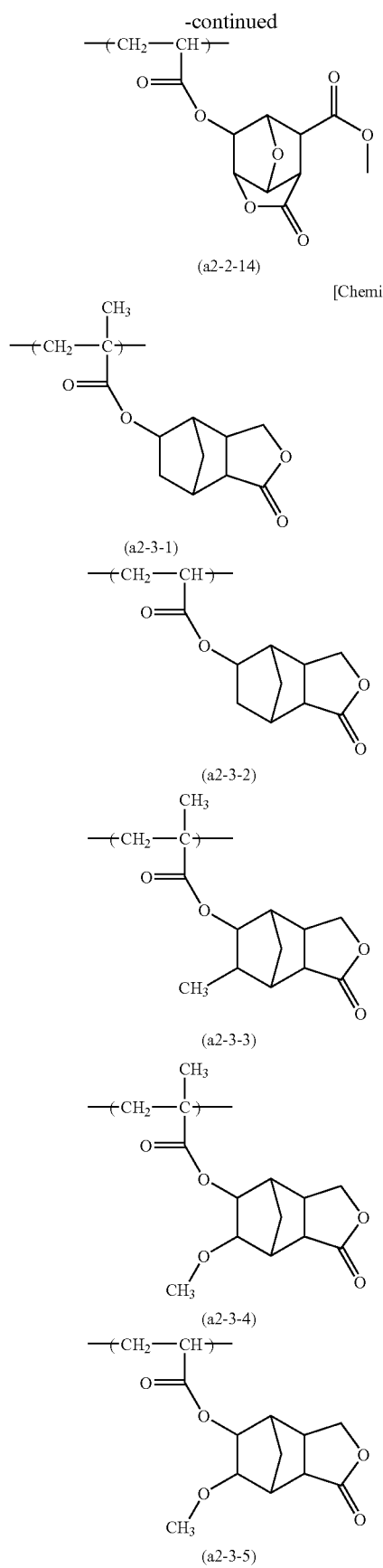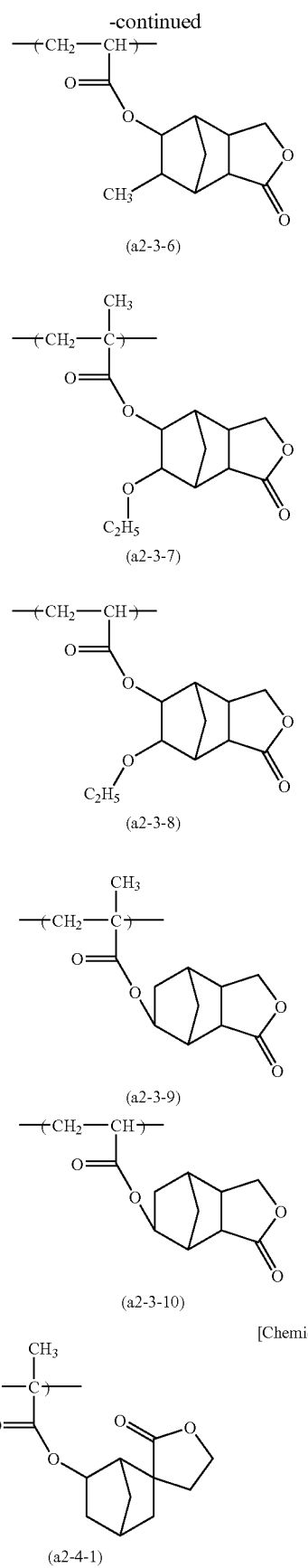

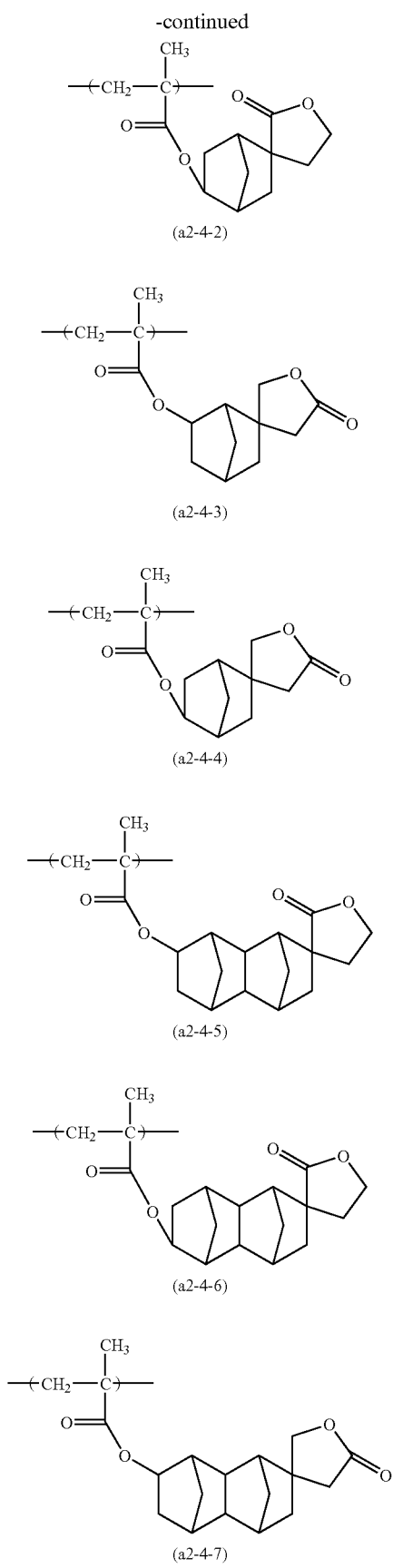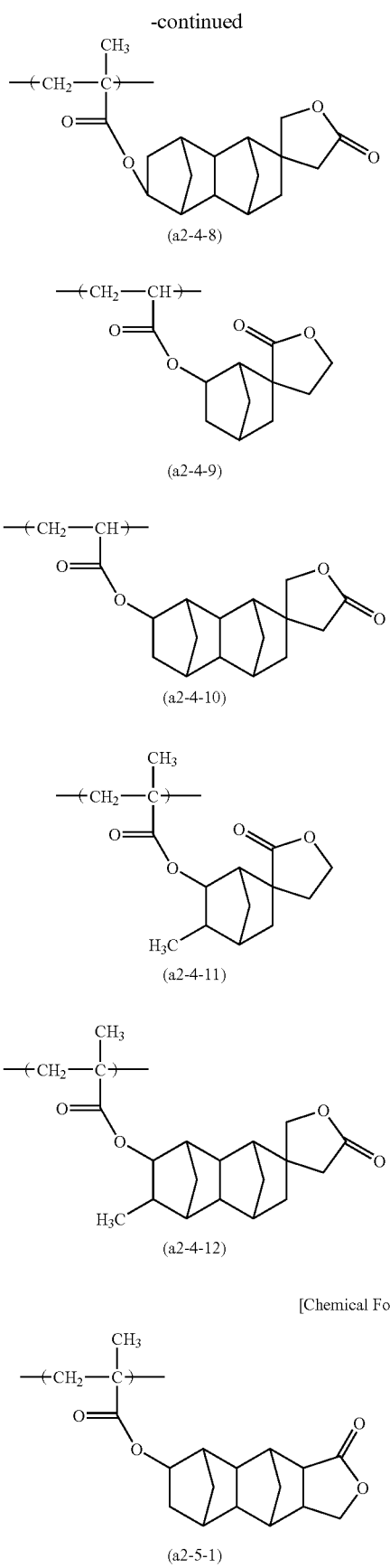

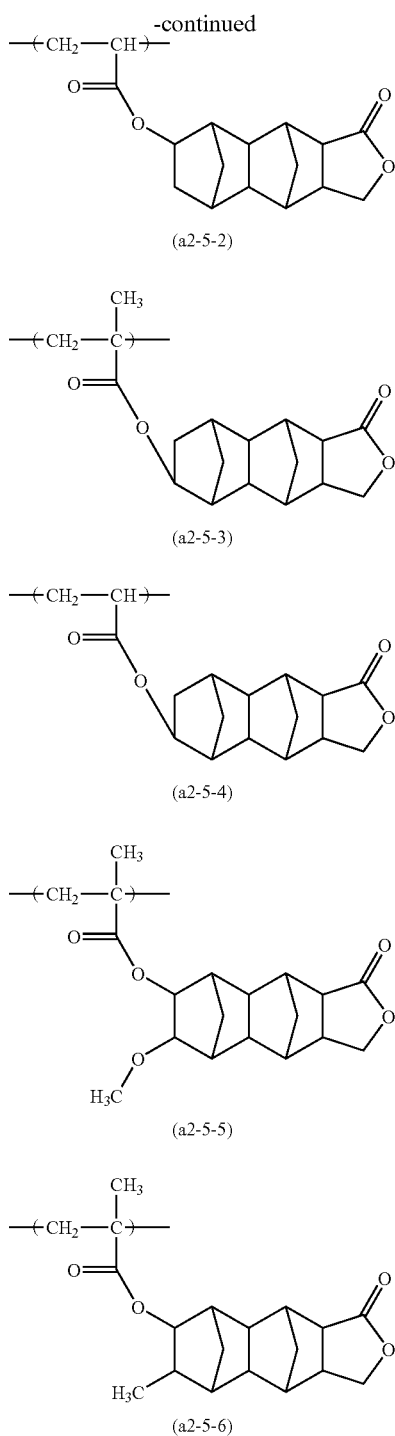

(a2-5-2)

(a2-5-3)

(a2-5-4)

(a2-5-5)

(a2-5-6)

As the structural unit (a2), at least one structural unit selected from the group consisting of structural units represented by General Formulas (a2-1) to (a2-5) is preferable, and at least one structural unit selected from the group consisting of structural units represented by General Formulas (a2-1) to (a2-3) is more preferable. Of these, it is preferable to use at least one structural unit selected from the group consisting of structural units represented by Chemical Formulas (a2-1-1), (a2-1-2), (a2-2-1), (a2-2-2), (a2-3-1), (a2-3-2), (a2-3-9) and (a2-3-10).

As the structural unit (a2), one type of structural unit may be used, or two or more types may be used in combination.

In the polymer compound of the present invention, the amount of the structural unit (a2) relative to the combined total of all the structural units constituting the polymer compound is preferably 5 to 60 mol %, more preferably 10 to 50 mol %, and still more preferably 20 to 50 mol %. By making the amount of the structural unit (a2) at least as large as the lower limit of the above-mentioned range, the effect of using the structural unit (a2) can be satisfactorily achieved. On the other hand, by making the amount of the structural unit (a2) no more than the upper limit of the above-mentioned range, a good balance can be achieved with the other structural units.

<Structural Unit (a3)>

The structural unit (a3) is a structural unit derived from an acrylate ester that contains a polar group-containing aliphatic hydrocarbon group.

By including the structural unit (a3) within the polymer compound of the present invention, the hydrophilicity of the polymer compound is improved, and hence, the compatibility of the polymer compound with the developing solution is improved and the solubility of the exposed portions in an alkali developing solution improves, which contributes to favorable improvements in the resolution.

Examples of the polar group include a hydroxyl group, cyano group, carboxyl group, or hydroxyalkyl group in which some of the hydrogen atoms of the alkyl group have been substituted with fluorine atoms, although a hydroxyl group is particularly desirable.

Examples of the aliphatic hydrocarbon group include linear or branched hydrocarbon groups (and preferably alkylene groups) of 1 to 10 carbon atoms, and polycyclic aliphatic hydrocarbon groups (polycyclic groups). These polycyclic groups can be selected appropriately from the multitude of groups that have been proposed for the resins of resist compositions designed for use with ArF excimer lasers. The polycyclic group preferably has 7 to 30 carbon atoms.

Of the various possibilities, structural units derived from an acrylate ester that include an aliphatic polycyclic group that contains a hydroxyl group, cyano group, carboxyl group or a hydroxyalkyl group in which some of the hydrogen atoms of the alkyl group have been substituted with fluorine atoms are particularly desirable. Examples of polycyclic groups include groups in which two or more hydrogen atoms have been removed from a bicycloalkane, tricycloalkane or tetracycloalkane or the like. Specific examples include groups in which two or more hydrogen atoms have been removed from a polycycloalkane such as adamantane, norbornane, isobornane, tricyclodecane or tetracyclododecane. Of these polycyclic groups, groups in which two or more hydrogen atoms have been removed from adamantane, groups in which two or more hydrogen atoms have been removed from norbornane, and groups in which two or more hydrogen atoms have been removed from tetracyclododecane are preferred industrially.

When the aliphatic hydrocarbon group within the polar group-containing aliphatic hydrocarbon group is a linear or branched hydrocarbon group of 1 to 10 carbon atoms, the structural unit (a3) is preferably a structural unit derived from a hydroxyethyl ester of acrylic acid. On the other hand, when the hydrocarbon group is a polycyclic group, structural units represented by Formulas (a3-1), (a3-2), and (a3-3) shown below are preferable.

[Chemical Formula 29]

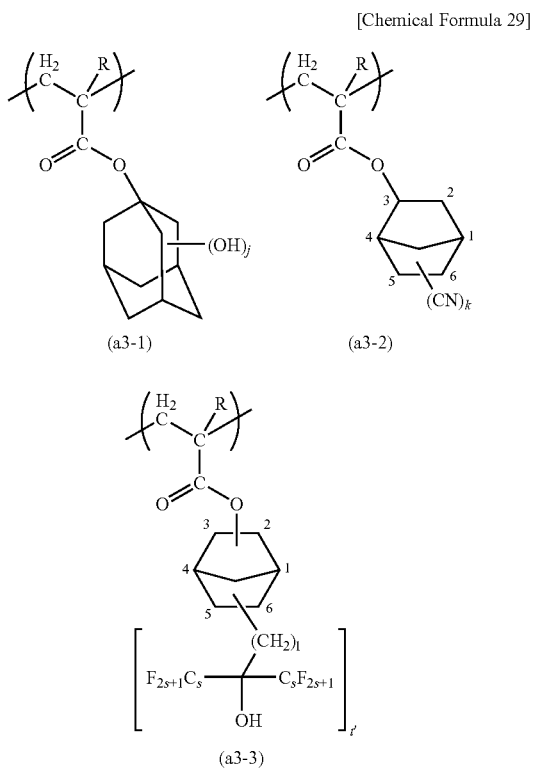

(a3-1)   (a3-2)

(a3-3)

[wherein R is as defined above; j is an integer of 1 to 3; k is an integer of 1 to 3; t' is an integer of 1 to 3; l is an integer of 1 to 5; and s is an integer of 1 to 3]

In Formula (a3-1), j is preferably 1 or 2, and is most preferably 1. When j is 2, it is preferable that the hydroxyl groups are bonded to the 3rd and 5th positions of the adamantyl group. When j is 1, it is preferable that the hydroxyl group be bonded to the 3rd position of the adamantyl group.

j is preferably 1, and it is particularly desirable that the hydroxyl group be bonded to the 3rd position of the adamantyl group.

In Formula (a3-2), k is preferably 1. The cyano group is preferably bonded to the 5th or 6th position of the norbornyl group.

In Formula (a3-3), t' is preferably 1, l is preferably 1, and s is preferably 1. Further, in Formula (a3-3), it is preferable that a 2-norbornyl group or 3-norbornyl group is bonded to the terminal of the carboxyl group of the acrylic acid. The fluorinated alkyl alcohol is preferably bonded to the 5th or 6th position of the norbornyl group.

As the structural unit (a3), one type of structural unit may be used, or two or more types may be used in combination.

When the polymer compound contains the structural unit (a3), the amount of structural unit (a3) relative to the combined total of all the structural units constituting the polymer compound is preferably 5 to 50 mol %, more preferably 5 to 40 mol %, and still more preferably 5 to 25 mol %. By making the amount of the structural unit (a3) at least as large as the lower limit of the above-mentioned range, the effect of using the structural unit (a3) can be satisfactorily achieved. On the other hand, by making the amount of the structural unit (a3) no more than the upper limit of the above-mentioned range, a good balance can be achieved with the other structural units.

<Structural Unit (a4)>

The polymer compound of the present invention may also include a structural unit (a4) besides the above-mentioned structural units (a1), (a2) and (a3), as long as the effects of the present invention are not impaired.

As the structural unit (a4), any other structural unit that cannot be classified as one of the above structural units (a2) and (a3) can be used without any particular limitations, and any of the multitude of conventional structural units used within resist resins for ArF excimer lasers or KrF excimer lasers (and particularly for ArF excimer lasers) can be used.

As the structural unit (a4), a structural unit derived from an acrylate ester that contains a non-acid-dissociable aliphatic polycyclic group is preferable. Examples of this polycyclic group include the same groups as those described above in connection with the aforementioned structural unit (a1), and any of the multitude of conventional polycyclic groups used within the resin component of resist compositions for ArF excimer lasers or KrF excimer lasers (and particularly for ArF excimer lasers) can be used.

In consideration of factors such as industrial availability, at least one polycyclic group selected from amongst a tricyclodecanyl group, adamantyl group, tetracyclododecanyl group, isobornyl group, and norbornyl group is particularly desirable. These polycyclic groups may include a linear or branched alkyl group of 1 to 5 carbon atoms as a substituent.

Specific examples of the structural unit (a4) include units with structures represented by General Formulas (a4-1) to (a4-5) shown below.

[Chemical Formula 30]

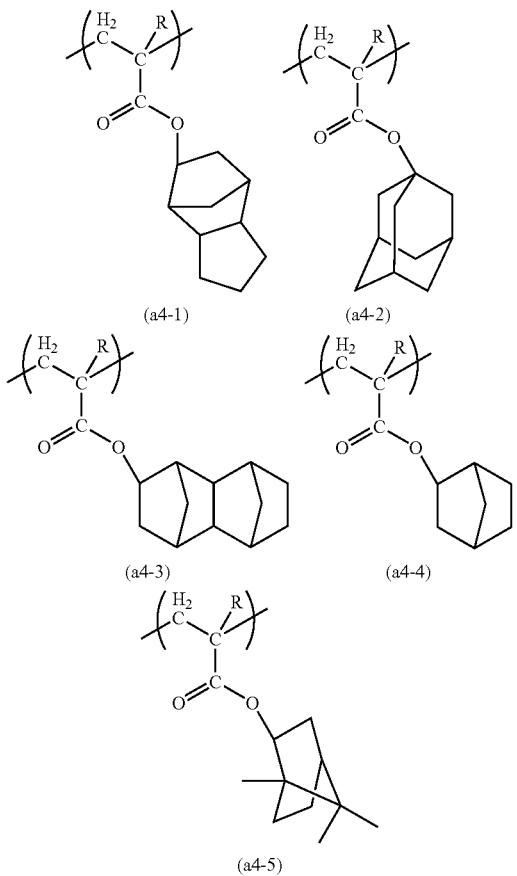

(a4-1)   (a4-2)

(a4-3)   (a4-4)

(a4-5)

[wherein R is as defined above]

When the structural unit (a4) is included in the polymer compound of the present invention, the amount of the structural unit (a4) within the polymer compound, relative to the combined total of all the structural units that constitute the polymer compound, is preferably from 1 to 30 mol %, and more preferably from 10 to 20 mol %.

The polymer compound of the present invention is a copolymer that includes at least the structural unit (a0) and the structural unit (a1), and is preferably a copolymer that includes the structural units (a0), (a1) and (a2), a copolymer that includes the structural units (a0), (a1) and (a3), or a copolymer that includes the structural units (a0), (a1), (a2) and (a3).

Examples of the copolymer include copolymers composed of the structural units (a0), (a1) and (a2), copolymers composed of the structural units (a0), (a1) and (a3), copolymers composed of the structural units (a0), (a1), (a2) and (a3), and copolymers composed of the structural units (a0), (a1), (a2), (a3) and (a4).

As the polymer compound, copolymers having the four structural units shown below in Formula (A1-11) are particularly desirable.

[Chemical Formula 31]

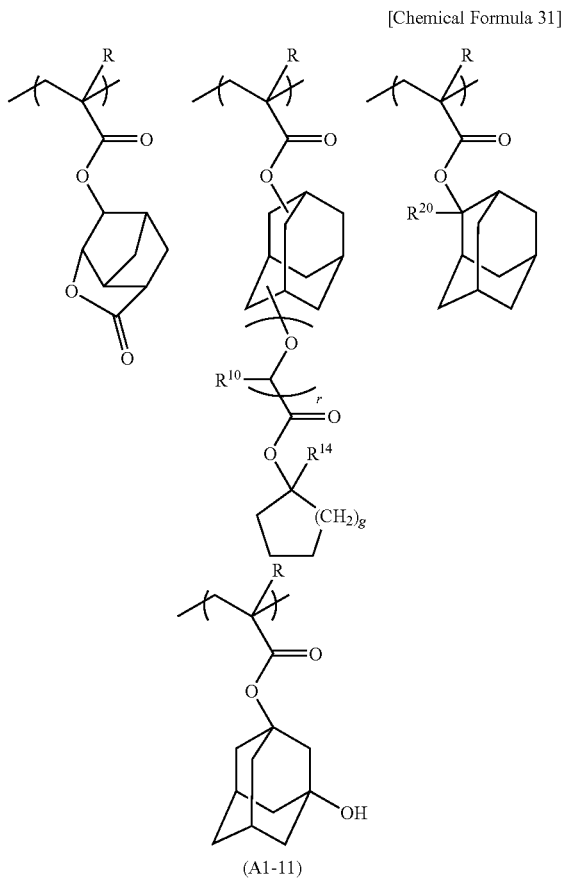

(A1-11)

[wherein, R, r, $R^{14}$, g and $R^{10}$ are as defined above; and $R^{20}$ represents a lower alkyl group]

In Formula (A1-11), the group R is as defined for R in General Formula (a0-1), and the plurality of R groups may be either the same or different.

r, $R^{14}$, g and $R^{10}$ are as defined above for r, $R^{14}$, g and $R^{10}$ respectively in General Formula (a0-1-1).

r is an integer of either 0 or 1, and is most preferably 1.

The lower alkyl group represented by $R^{14}$ is as defined for the lower alkyl group represented by R in General Formula (a0-1), is preferably a methyl group or ethyl group, and is most preferably an ethyl group.

g is preferably an integer of 1 to 3, is more preferably either 1 or 2, and is most preferably 2.

$R^{10}$ represents a hydrogen atom or a methyl group, and is preferably a methyl group.

In the adamantane structure, the bonding position for the oxygen at the terminal of the carbonyloxy group (—C(O)—O—) that is bonded at the α-position of the structural unit is preferably the 1st position on the adamantane ring. Further, the bonding position for the oxygen atom at the terminal of the —(O—C($R^{10}$))$_r$— group is preferably the 3rd position on the adamantane ring.

Furthermore, the lower alkyl group represented by $R^{20}$ is as defined for the lower alkyl group represented by R in General Formula (a0-1), is preferably a methyl group or ethyl group, and is most preferably an ethyl group.

The polymer compound can be obtained, for example, by a conventional radical polymerization or the like of the monomers corresponding with the structural unit (a0) and the structural unit (a1), where necessary together with monomers corresponding with other structural units, using a radical polymerization initiator such as azobisisobutyronitrile (AIBN).

Furthermore, in the polymer compound, by using a chain transfer agent such as HS—$CH_2$—$CH_2$—$CH_2$—C($CF_3$)$_2$—OH during the polymerization, a —C($CF_3$)$_2$—OH group can be introduced at the terminals of the polymer compound. Such a copolymer, having an introduced hydroxyalkyl group in which some of the hydrogen atoms of the alkyl group are substituted with fluorine atoms, is effective in reducing developing defects and LER (line edge roughness: unevenness of the side walls of a line pattern).

The weight average molecular weight (Mw) (the polystyrene equivalent value determined by gel permeation chromatography) of the polymer compound is not particularly limited, but is preferably 2,000 to 50,000, more preferably 3,000 to 30,000, and most preferably 5,000 to 20,000. By making the weight average molecular weight no more than the upper limit of the above-mentioned range, the polymer compound exhibits satisfactory solubility in a resist solvent when used as a resist. On the other hand, by making the weight average molecular weight at least as large as the lower limit of the above-mentioned range, the dry etching resistance and cross-sectional shape of the resist pattern become satisfactory.

Further, the dispersity (Mw/Mn) is preferably 1.0 to 5.0, more preferably 1.0 to 3.0, and is most preferably 1.2 to 2.5. Here, Mn is the number average molecular weight.

The polymer compound of the present invention described above is a novel compound that until now has been unknown.

When the polymer compound of the present invention is added to a positive resist composition, for example with an acid generator component (B) that generates acid upon exposure, then when acid is generated from the acid generator component (B) by exposure (irradiation), the action of that acid causes cleavage of the bond between the group $R^1$ within the structural unit (a0) and the oxygen atom bonded to $R^1$, resulting in the dissociation of $R^1$. Further, the bond between the acid dissociable, dissolution inhibiting group within the structural unit (a1) and the oxygen atom bonded to the acid dissociable, dissolution inhibiting group is also cleaved, causing dissociation of the acid dissociable, dissolution inhibiting group. As a result, the solubility of the polymer compound in an alkali developing solution increases significantly.

Accordingly, the polymer compound of the present invention is useful as the base resin for a chemically amplified positive resist composition, and can be used favorably as a resin component (A) within a positive resist composition described below.

<<Positive Resist Composition>>

A positive resist composition of the present invention includes a resin component (A) (hereafter, frequently referred to as "component (A)") that exhibits increased solubility in an alkali developing solution under the action of acid, and an acid generator component (B) (hereafter, frequently referred to as "component (B)") that generates acid upon exposure.

When this positive resist composition is subjected to irradiation (exposure), acid is generated from the component (B), and the action of that acid causes an increase in the solubility of the component (A) in alkali developing solutions. As a result, during resist pattern formation, when a resist film obtained using the positive resist composition is subjected to selective exposure, the solubility in the alkali developing solution of the exposed portions of the resist film increases, whereas the solubility in the alkali developing solution of the unexposed portions remains unchanged, meaning alkali developing can then be used to form a resist pattern.

<Component (A)>

The component (A) includes the polymer compound of the present invention described above (hereafter also referred to as "polymer compound (A1)" or "component (A1)").

The polymer compound (A1) is a polymer compound containing the above structural unit (a0) and the above structural unit (a1), and preferably also contains the structural unit (a2) and/or the structural unit (a3).

In the component (A), either a single type of polymer compound (A1) may be used, or two or more types may be used in combination.

The proportion of the polymer compound (A1) within the component (A), relative to the total weight of the component (A), is preferably from 50 to 100% by weight, more preferably from 80 to 100% by weight, and may be 100% by weight.

The component (A) may include a "resin component that exhibits increased solubility in an alkali developing solution under action of acid" (hereafter referred to as "component (A2)") besides the above polymer compound (A1), as long as the effects of the present invention are not impaired.

There are no particular limitations on this component (A2), which may be selected appropriately from the multitude of components known as resin components for chemically amplified positive resist compositions (such as conventional base resins for ArF excimer lasers and KrF excimer lasers (and particularly ArF excimer lasers)). Examples of base resins for use with ArF excimer lasers include resins that do not contain the structural unit (a0), but include the structural unit (a1) as an essential structural unit, and may also arbitrarily include the structural units (a2) to (a4).

As the component (A2), either a single type of component may be used, or two or more types may be used in combination.

The amount of the component (A) within the resist composition of the present invention may be adjusted in accordance with factors such as the film thickness of the resist to be formed.

<Component (B)>

As the component (B), there is no particular limitation, and any of the known acid generators used in conventional chemically amplified resist compositions can be used. Examples of these acid generators are numerous, and include onium salt-based acid generators such as iodonium salts and sulfonium salts; oxime sulfonate-based acid generators; diazomethane-based acid generators such as bisalkyl or bisaryl sulfonyl diazomethanes and poly(bis-sulfonyl)diazomethanes; nitrobenzylsulfonate-based acid generators; iminosulfonate-based acid generators; and disulfone-based acid generators.

As an onium salt-based acid generator, a compound represented by General Formula (b-1) or (b-2) shown below can be used.

[Chemical Formula 32]

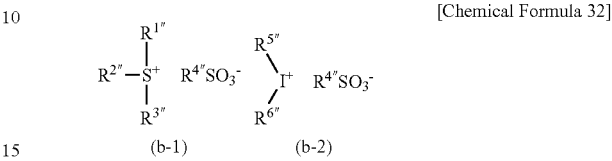

[wherein $R^{1\prime\prime}$ to $R^{3\prime\prime}$, $R^{5\prime\prime}$ and $R^{6\prime\prime}$ each independently represents an aryl group or alkyl group, wherein two of $R^{1\prime\prime}$ to $R^{3\prime\prime}$ in formula (b-1) may be bonded to each other to form a ring with the sulfur atom; and $R^{4\prime\prime}$ represents an alkyl group, halogenated alkyl group, aryl group or alkenyl group that may have a substituent; with the proviso that at least one of $R^{1\prime\prime}$ to $R^{3\prime\prime}$ represents an aryl group, and at least one of $R^{5\prime\prime}$ and $R^{6\prime\prime}$ represents an aryl group]

In Formula (b-1), $R^{1\prime\prime}$ to $R^{3\prime\prime}$ each independently represents an aryl group or an alkyl group. In Formula (b-1), two of $R^{1\prime\prime}$ to $R^{3\prime\prime}$ may be bonded to each other to form a ring with the sulfur atom.

Further, among $R^{1\prime\prime}$ to $R^{3\prime\prime}$, at least one group represents an aryl group. Among $R^{1\prime\prime}$ to $R^{3\prime\prime}$, two or more groups are preferably aryl groups, and it is particularly desirable that all of $R^{1\prime\prime}$ to $R^{3\prime\prime}$ are aryl groups.

The aryl group for $R^{1\prime\prime}$ to $R^{3\prime\prime}$ is not particularly limited. For example, an aryl group having 6 to 20 carbon atoms may be used, in which some or all of the hydrogen atoms of the aryl group may or may not be substituted with alkyl groups, alkoxy groups, halogen atoms or hydroxyl groups.

The aryl group is preferably an aryl group having 6 to 10 carbon atoms because it can be synthesized at low cost. Specific examples thereof include a phenyl group and a naphthyl group.

The alkyl group with which hydrogen atoms of the aryl group may be substituted is preferably an alkyl group having 1 to 5 carbon atoms, and is most preferably a methyl group, ethyl group, propyl group, n-butyl group or tert-butyl group.

The alkoxy group with which hydrogen atoms of the aryl group may be substituted is preferably an alkoxy group having 1 to 5 carbon atoms, is more preferably a methoxy group, ethoxy group, n-propoxy group, iso-propoxy group, n-butoxy group or tert-butoxy group, and is most preferably a methoxy group or ethoxy group.

The halogen atom with which hydrogen atoms of the aryl group may be substituted is preferably a fluorine atom.

The alkyl group for $R^{1\prime\prime}$ to $R^{3\prime\prime}$ is not particularly limited and includes, for example, a linear, branched or cyclic alkyl group having 1 to 10 carbon atoms. In terms of achieving excellent resolution, the alkyl group preferably has 1 to 5 carbon atoms. Specific examples thereof include a methyl group, ethyl group, n-propyl group, isopropyl group, n-butyl group, isobutyl group, n-pentyl group, cyclopentyl group, hexyl group, cyclohexyl group, nonyl group and decanyl group. A methyl group is most preferable because it is excellent in resolution and can be synthesized at low cost.

When two of $R^{1\prime\prime}$ to $R^{3\prime\prime}$ in Formula (b-1) are bonded to each other to form a ring with the sulfur atom, it is preferable that the two of $R^{1\prime\prime}$ to $R^{3\prime\prime}$ form a 3- to 10-membered ring including the sulfur atom, and it is particularly desirable that the two of $R^{1\prime\prime}$ to $R^{3\prime\prime}$ form a 5- to 7-membered ring including the sulfur atom.

When two of $R^{1\prime\prime}$ to $R^{3\prime\prime}$ in Formula (b-1) are bonded to each other to form a ring with the sulfur atom, the remaining one of $R^{1\prime\prime}$ to $R^{3\prime\prime}$ is preferably an aryl group. Examples of this aryl group include the same groups as the above-mentioned aryl groups for $R^{1\prime\prime}$ to $R^{3\prime\prime}$.

$R^{4\prime\prime}$ represents an alkyl group, halogenated alkyl group, aryl group or alkenyl group that may have a substituent.

The alkyl group represented by $R^{4\prime\prime}$ may be a linear, branched or cyclic alkyl group.

The linear or branched alkyl group preferably has 1 to 10 carbon atoms, more preferably 1 to 8 carbon atoms, and most preferably 1 to 4 carbon atoms.

The cyclic alkyl group preferably has 4 to 15 carbon atoms, more preferably 4 to 10 carbon atoms, and most preferably 6 to 10 carbon atoms.

Examples of the halogenated alkyl group represented by $R^{4\prime\prime}$ include groups in which some or all of the hydrogen atoms of an above-mentioned linear, branched or cyclic alkyl group have been substituted with halogen atoms.

Examples of the halogen atom include a fluorine atom, chlorine atom, bromine atom and iodine atom, and a fluorine atom is particularly desirable.

In the halogenated alkyl group, the ratio of the number of halogen atoms relative to the combined total of halogen atoms and hydrogen atoms within the halogenated alkyl group (namely, the halogenation ratio (%)) is preferably 10 to 100%, more preferably 50 to 100%, and is most preferably 100%. Higher halogenation ratios are preferred, as they result in increased acid strength.

The aryl group represented by $R^{4\prime\prime}$ is preferably an aryl group of 6 to 20 carbon atoms.

The alkenyl group represented by $R^{4\prime\prime}$ is preferably an alkenyl group of 2 to 10 carbon atoms.

In the group $R^{4\prime\prime}$, the expression "may have a substituent" means that some or all of the hydrogen atoms within the linear, branched or cyclic alkyl group, or the halogenated alkyl group, aryl group or alkenyl group may be substituted with a substituent (an atom other than a hydrogen atom or a group).

The number of substituents within $R^{4\prime\prime}$ may be either 1, or 2 or greater.

Examples of the substituents include halogen atoms, hetero atoms, alkyl groups, and groups represented by $R^5$—O— [wherein, $R^5$ represents a monovalent aromatic organic group, a monovalent aliphatic hydrocarbon group, or a hydroxyalkyl group].

Examples of the halogen atoms and alkyl groups include the same halogen atoms and alkyl groups exemplified above for the halogenated alkyl group of $R^{4\prime\prime}$.

Examples of the hetero atoms include an oxygen atom, nitrogen atom and sulfur atom.

In the above group represented by $R^5$—O—, examples of the monovalent aromatic organic group represented by $R^5$ include aryl groups in which one hydrogen atom has been removed from an aromatic hydrocarbon ring, such as a phenyl group, biphenyl group, fluorenyl group, naphthyl group, anthryl group and phenanthryl group; heteroaryl groups in which some of the carbon atoms constituting the ring(s) of these aryl groups are substituted with hetero atoms such as an oxygen atom, a sulfur atom or a nitrogen atom; and arylalkyl groups such as a benzyl group, phenethyl group, 1-naphthylmethyl group, 2-naphthylmethyl group, 1-naphthylethyl group and 2-naphthylethyl group.

The number of carbon atoms of the alkyl chain within the above arylalkyl group is preferably from 1 to 4, more preferably 1 or 2, and is most preferably 1.

These aryl groups, heteroaryl groups and arylalkyl groups may have a substituent such as an alkyl group of 1 to 10 carbon atoms, a halogenated alkyl group, an alkoxy group, a hydroxyl group or a halogen atom. An alkyl group or halogenated alkyl group substituent preferably contains 1 to 8 carbon atoms, and more preferably 1 to 4 carbon atoms. Further, the halogenated alkyl group is preferably a fluorinated alkyl group. Examples of the halogen atom include a fluorine atom, chlorine atom, iodine atom and bromine atom, and a fluorine atom is particularly desirable.

As the monovalent aromatic organic group represented by $R^5$, an arylalkyl group is preferable, an arylmethyl group is more preferable, and a naphthylmethyl group is the most desirable.

Examples of the monovalent aliphatic hydrocarbon group represented by $R^5$ include linear, branched or cyclic monovalent saturated hydrocarbon groups of 1 to 15 carbon atoms, or linear or branched monovalent aliphatic unsaturated hydrocarbon groups of 2 to 5 carbon atoms.

Specific examples of the linear monovalent saturated hydrocarbon groups include a methyl group, ethyl group, propyl group, butyl group, pentyl group, hexyl group, heptyl group, octyl group, nonyl group and decanyl group.

Specific examples of the branched monovalent saturated hydrocarbon groups include a 1-methylethyl group, 1-methylpropyl group, 2-methylpropyl group, 1-methylbutyl group, 2-methylbutyl group, 3-methylbutyl group, 1-ethylbutyl group, 2-ethylbutyl group, 1-methylpentyl group, 2-methylpentyl group, 3-methylpentyl group and 4-methylpentyl group.

The cyclic monovalent saturated hydrocarbon group may be either a polycyclic group or a monocyclic group, and examples include groups in which one hydrogen atom has been removed from a monocycloalkane or a polycycloalkane such as a bicycloalkane, tricycloalkane or tetracycloalkane. Specific examples include groups in which one hydrogen atom has been removed from a monocycloalkane such as cyclopentane, cyclohexane, cycloheptane or cyclooctane; and groups in which one hydrogen atom has been removed from a polycycloalkane such as adamantane, norbornane, isobornane, tricyclodecane or tetracyclododecane.

Examples of the linear monovalent unsaturated hydrocarbon groups include a vinyl group, propenyl group (allyl group) and butenyl group.

Examples of the branched monovalent unsaturated hydrocarbon groups include a 1-methylpropenyl group and 2-methylpropenyl group.

The number of carbon atoms in the monovalent aliphatic hydrocarbon group represented by $R^5$ is preferably from 2 to 4, and is most preferably 3.

The hydroxyalkyl group represented by $R^5$ is a linear, branched or cyclic monovalent saturated hydrocarbon group in which at least one hydrogen atom has been substituted with a hydroxyl group. A linear or branched monovalent saturated hydrocarbon group in which one or two hydrogen atoms have been substituted with hydroxyl groups is preferable. Specific examples include a hydroxymethyl group, hydroxyethyl group, 1-hydroxypropyl group, 2-hydroxypropyl group, 3-hydroxypropyl group and 2,3-dihydroxypropyl group.

The number of carbon atoms within the monovalent hydroxyalkyl group represented by $R^5$ is preferably from 1 to 10, more preferably from 1 to 8, still more preferably from 1 to 6, and is most preferably from 1 to 3.

In Formula (b-2), $R^{5'''}$ and $R^{6'''}$ each independently represents an aryl group or alkyl group. At least one of $R^{5'''}$ and $R^{6'''}$ represents an aryl group. It is preferable that both of $R^{5'''}$ and $R^{6'''}$ represent an aryl group.

As the aryl group for $R^{5'''}$ and $R^{6'''}$, the same as the aryl groups for $R^{1'''}$ to $R^{3'''}$ can be exemplified.

As the alkyl group for $R^{5'''}$ and $R^{6'''}$, the same as the alkyl groups for $R^{1'''}$ to $R^{3'''}$ can be exemplified.

It is particularly desirable that both of $R^{5'''}$ and $R^{6'''}$ represents a phenyl group.

As $R^{4'''}$ in formula (b-2), the same as those mentioned above for $R^{4'''}$ in Formula (b-1) can be exemplified.

Specific examples of suitable onium salt-based acid generators represented by Formula (b-1) or (b-2) include diphenyliodonium trifluoromethanesulfonate or nonafluorobutanesulfonate; bis(4-tert-butylphenyl)iodonium trifluoromethanesulfonate or nonafluorobutanesulfonate; triphenylsulfonium trifluoromethanesulfonate, heptafluoropropanesulfonate or nonafluorobutanesulfonate; tri(4-methylphenyl)sulfonium trifluoromethanesulfonate, heptafluoropropanesulfonate or nonafluorobutanesulfonate; dimethyl(4-hydroxynaphthyl)sulfonium trifluoromethanesulfonate, heptafluoropropanesulfonate or nonafluorobutanesulfonate; monophenyldimethylsulfonium trifluoromethanesulfonate, heptafluoropropanesulfonate or nonafluorobutanesulfonate; diphenylmonomethylsulfonium trifluoromethanesulfonate, heptafluoropropanesulfonate or nonafluorobutanesulfonate; (4-methylphenyl)diphenylsulfonium trifluoromethanesulfonate, heptafluoropropanesulfonate or nonafluorobutanesulfonate; (4-methoxyphenyl)diphenylsulfonium trifluoromethanesulfonate, heptafluoropropanesulfonate or nonafluorobutanesulfonate; tri(4-tert-butyl)phenylsulfonium trifluoromethanesulfonate, heptafluoropropanesulfonate or nonafluorobutanesulfonate; diphenyl(1-(4-methoxy)naphthyl)sulfonium trifluoromethanesulfonate, heptafluoropropanesulfonate or nonafluorobutanesulfonate; di(1-naphthyl)phenylsulfonium trifluoromethanesulfonate, heptafluoropropanesulfonate or nonafluorobutanesulfonate; 1-phenyltetrahydrothiophenium trifluoromethanesulfonate, heptafluoropropanesulfonate or nonafluorobutanesulfonate; 1-(4-methylphenyl)tetrahydrothiophenium trifluoromethanesulfonate, heptafluoropropanesulfonate or nonafluorobutanesulfonate; 1-(3,5-dimethyl-4-hydroxyphenyl)tetrahydrothiophenium trifluoromethanesulfonate, heptafluoropropanesulfonate or nonafluorobutanesulfonate; 1-(4-methoxynaphthalene-1-yl)tetrahydrothiophenium trifluoromethanesulfonate, heptafluoropropanesulfonate or nonafluorobutanesulfonate; 1-(4-ethoxynaphthalene-1-yl)tetrahydrothiophenium trifluoromethanesulfonate, heptafluoropropanesulfonate or nonafluorobutanesulfonate; 1-(4-n-butoxynaphthalene-1-yl)tetrahydrothiophenium trifluoromethanesulfonate, heptafluoropropanesulfonate or nonafluorobutanesulfonate; 1-phenyltetrahydrothiopyranium trifluoromethanesulfonate, heptafluoropropanesulfonate or nonafluorobutanesulfonate; 1-(4-hydroxyphenyl)tetrahydrothiopyranium trifluoromethanesulfonate, heptafluoropropanesulfonate or nonafluorobutanesulfonate; 1-(3,5-dimethyl-4-hydroxyphenyl)tetrahydrothiopyranium trifluoromethanesulfonate, heptafluoropropanesulfonate or nonafluorobutanesulfonate; and 1-(4-methylphenyl)tetrahydrothiopyranium trifluoromethanesulfonate, heptafluoropropanesulfonate or nonafluorobutanesulfonate.

It is also possible to use onium salts in which the anion moiety of these onium salts is replaced by methanesulfonate, n-propanesulfonate, n-butanesulfonate, or n-octanesulfonate.

Moreover, onium salts in which a sulfonate of a fluoroalkyl (in which the alkyl group has 1 to 10 carbon atoms) having a group represented by the above $R^5$—O— acts as the anion moiety may also be used.

Further, onium salt-based acid generators in which the anion moiety in General Formula (b-1) or (b-2) is replaced by an anion moiety represented by General Formula (b-3) or (b-4) shown above (the cation moiety is the same as (b-1) or (b-2)) may also be used.

[Chemical Formula 33]

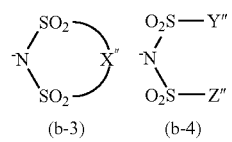

[wherein, X'' represents an alkylene group of 2 to 6 carbon atoms in which at least one hydrogen atom has been substituted with a fluorine atom; and Y'' and Z'' each independently represents an alkyl group of 1 to 10 carbon atoms in which at least one hydrogen atom has been substituted with a fluorine atom.]

X'' represents a linear or branched alkylene group in which at least one hydrogen atom has been substituted with a fluorine atom, wherein the alkylene group has 2 to 6 carbon atoms, preferably has 3 to 5 carbon atoms, and most preferably has 3 carbon atoms.

Y'' and Z'' each independently represents a linear or branched alkyl group in which at least one hydrogen atom has been substituted with a fluorine atom, wherein the alkyl group has 1 to 10 carbon atoms, preferably has 1 to 7 carbon atoms, and more preferably has 1 to 3 carbon atoms.

The smaller the number of carbon atoms in the alkylene group of X'' or the alkyl group of Y'' and Z'' within the above-specified range for the number of carbon atoms, the more the solubility of the compound in a resist solvent improves.

Further, in the alkylene group of X'' or the alkyl group of Y'' and Z'', it is preferable that the number of hydrogen atoms substituted with fluorine atoms is as large as possible, as the acid strength increases, and the transparency to high energy radiation of 200 nm or less or electron beams is improved.

The proportion of fluorine atoms within the alkylene group or alkyl group, namely the fluorination ratio, is preferably from 70 to 100%, and more preferably from 90 to 100%, and it is particularly desirable that the alkylene group or alkyl group is a perfluoroalkylene or perfluoroalkyl group in which all the hydrogen atoms are substituted with fluorine atoms.

Furthermore, as an onium salt-based acid generator, a sulfonium salt having a cation moiety represented by General Formula (b-5) or (b-6) shown below may also be used.

[Chemical Formula 34]

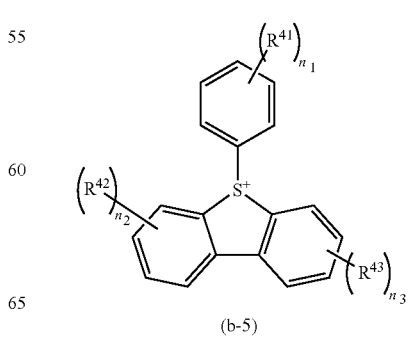

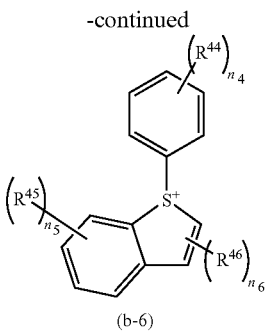

(b-6)

[wherein $R^{41}$ to $R^{46}$ each independently represents an alkyl group, an acetyl group, an alkoxy group, a carboxyl group, a hydroxyl group or a hydroxyalkyl group; $n_1$ to $n_5$ each independently represents an integer of 0 to 3; and $n_6$ represents an integer of 0 to 2]

With respect to $R^{41}$ to $R^{46}$, the alkyl group is preferably an alkyl group of 1 to 5 carbon atoms, more preferably a linear or branched alkyl group, and is most preferably a methyl group, ethyl group, propyl group, isopropyl group, n-butyl group or tert butyl group.

The alkoxy group is preferably an alkoxy group of 1 to 5 carbon atoms, more preferably a linear or branched alkoxy group, and is most preferably a methoxy group or ethoxy group.

The hydroxyalkyl group is preferably an aforementioned alkyl group in which one or more hydrogen atoms have been substituted with hydroxy groups, and examples thereof include a hydroxymethyl group, hydroxyethyl group and hydroxypropyl group.

When the subscripts $n_1$ to $n_6$ of $R^{41}$ to $R^{46}$ represent an integer of 2 or more, the plurality of $R^{41}$ to $R^{46}$ may be the same or different.

$n_1$ is preferably 0 to 2, more preferably 0 or 1, and still more preferably 0.

It is preferable that $n_2$ and $n_3$ each independently represent 0 or 1, and more preferably 0.

$n_4$ is preferably 0 to 2, and more preferably 0 or 1.

$n_5$ is preferably 0 or 1, and more preferably 0.

$n_6$ is preferably 0 or 1, and more preferably 1.

The anion moiety of the sulfonium salt having a cation moiety represented by General Formula (b-5) or (b-6) is not particularly limited, and the same anion moieties as those proposed for conventional onium salt-based acid generators may be used. Examples of such anion moieties include fluorinated alkylsulfonic acid ions such as anion moieties ($R^{4"}SO_3^-$) for onium salt-based acid generators represented by General Formula (b-1) or (b-2) shown above; and anion moieties represented by General Formula (b-3) or (b-4) shown above.

In the present description, an oximesulfonate-based acid generator is a compound having at least one group represented by General Formula (B-1) shown below, and has a feature of generating acid upon irradiation. Such oximesulfonate-based acid generators are widely used for chemically amplified resist compositions, and can be appropriately selected.

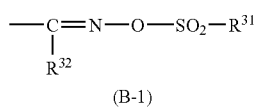

(B-1)

[Chemical Formula 35]

[wherein $R^{31}$ and $R^{32}$ each independently represents an organic group]

The organic group for $R^{31}$ and $R^{32}$ refers to a group containing a carbon atom, and may include atoms other than carbon atoms (for example, a hydrogen atom, an oxygen atom, a nitrogen atom, a sulfur atom, a halogen atom (such as a fluorine atom or chlorine atom) and the like).

As the organic group for $R^{31}$, a linear, branched, or cyclic alkyl group or aryl group is preferable. The alkyl group or the aryl group may have a substituent. The substituent is not particularly limited, and examples thereof include a fluorine atom and a linear, branched, or cyclic alkyl group having 1 to 6 carbon atoms.

The expression "have a substituent" means that some or all of the hydrogen atoms of the alkyl group or the aryl group are substituted with substituents.

The alkyl group preferably has 1 to 20 carbon atoms, more preferably 1 to 10 carbon atoms, still more preferably 1 to 8 carbon atoms, still more preferably 1 to 6 carbon atoms, and most preferably 1 to 4 carbon atoms. As the alkyl group, a partially or completely halogenated alkyl group (hereinafter, sometimes referred to as a "halogenated alkyl group") is particularly desirable.

The "partially halogenated alkyl group" refers to an alkyl group in which some of the hydrogen atoms are substituted with halogen atoms, and the "completely halogenated alkyl group" refers to an alkyl group in which all of the hydrogen atoms are substituted with halogen atoms. Examples of the halogen atom include a fluorine atom, a chlorine atom, a bromine atom and an iodine atom, and a fluorine atom is particularly desirable. In other words, the halogenated alkyl group is preferably a fluorinated alkyl group.

The aryl group preferably has 4 to 20 carbon atoms, more preferably 4 to 10 carbon atoms, and most preferably 6 to 10 carbon atoms. As the aryl group, a partially or completely halogenated aryl group is particularly desirable. The "partially halogenated aryl group" refers to an aryl group in which some of the hydrogen atoms are substituted with halogen atoms, and the "completely halogenated aryl group" refers to an aryl group in which all of hydrogen atoms are substituted with halogen atoms.

As $R^{31}$, an alkyl group of 1 to 4 carbon atoms which has no substituent or a fluorinated alkyl group of 1 to 4 carbon atoms is particularly desirable.

As the organic group for $R^{32}$, a linear, branched, or cyclic alkyl group, aryl group, or cyano group is preferable. Examples of the alkyl group and the aryl group for $R^{32}$ are the same as those of the alkyl group and the aryl group for $R^{31}$.

As $R^{32}$, a cyano group, an alkyl group of 1 to 8 carbon atoms having no substituent or a fluorinated alkyl group of 1 to 8 carbon atoms is particularly desirable.

Preferred examples of the oxime sulfonate-based acid generator include compounds represented by General Formula (B-2) or (B-3) shown below.

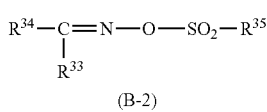

(B-2)

[wherein $R^{33}$ represents a cyano group, an alkyl group having no substituent or a halogenated alkyl group; $R^{34}$ represents an aryl group; and $R^{35}$ represents an alkyl group having no substituent or a halogenated alkyl group]

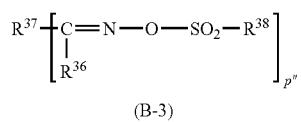

(B-3)

[wherein $R^{36}$ represents a cyano group, an alkyl group having no substituent or a halogenated alkyl group; $R^{37}$ represents a divalent or trivalent aromatic hydrocarbon group; $R^{38}$ represents an alkyl group having no substituent or a halogenated alkyl group; and p" represents 2 or 3.

In General Formula (B-2), the alkyl group having no substituent or the halogenated alkyl group for $R^{33}$ preferably contains 1 to 10 carbon atoms, more preferably 1 to 8 carbon atoms, and most preferably 1 to 6 carbon atoms.

As $R^{33}$, a halogenated alkyl group is preferable, and a fluorinated alkyl group is more preferable.

The fluorinated alkyl group for $R^{33}$ preferably has 50% or more of the hydrogen atoms thereof fluorinated, more preferably 70% or more fluorinated, and most preferably 90% or more fluorinated.

Examples of the aryl group for $R^{34}$ include groups in which one hydrogen atom has been removed from an aromatic hydrocarbon ring, such as a phenyl group, biphenyl group, fluorenyl group, naphthyl group, anthryl group and phenanthryl group, and heteroaryl groups in which some of the carbon atoms constituting the ring(s) of these groups are substituted with hetero atoms such as an oxygen atom, a sulfur atom or a nitrogen atom. Of these, a fluorenyl group is preferable.

The aryl group for $R^{34}$ may have a substituent such as an alkyl group of 1 to 10 carbon atoms, a halogenated alkyl group, or an alkoxy group. The alkyl group and halogenated alkyl group as the substituent preferably has 1 to 8 carbon atoms, and more preferably 1 to 4 carbon atoms. The halogenated alkyl group is preferably a fluorinated alkyl group.

The alkyl group having no substituent or the halogenated alkyl group for $R^{35}$ preferably contains 1 to 10 carbon atoms, more preferably 1 to 8 carbon atoms, and most preferably 1 to 6 carbon atoms.

As $R^{35}$, a halogenated alkyl group is preferable, and a fluorinated alkyl group is more preferable.

In terms of enhancing the strength of the acid generated, the fluorinated alkyl group for $R^{35}$ preferably has 50% or more of the hydrogen atoms fluorinated, more preferably 70% or more fluorinated, and still more preferably 90% or more fluorinated. A completely fluorinated alkyl group in which 100% of the hydrogen atoms are substituted with fluorine atoms is particularly desirable.

In General Formula (B-3), the alkyl group having no substituent and the halogenated alkyl group for $R^{36}$ are the same as the alkyl group having no substituent and the halogenated alkyl group represented by $R^{33}$ in the above General Formula (B-2).

Examples of the divalent or trivalent aromatic hydrocarbon group for $R^{37}$ include groups in which one or two additional hydrogen atoms have been removed from the aryl group represented by $R^{34}$ in the above General Formula (B-2).

As the alkyl group having no substituent or the halogenated alkyl group represented by $R^{38}$, the same group as the alkyl group having no substituent or the halogenated alkyl group represented by $R^{35}$ in the above General Formula (B-2) can be used.

p" is preferably 2.

Specific examples of suitable oxime sulfonate-based acid generators include α-(p-toluenesulfonyloxyimino)-benzyl cyanide, α-(p-chlorobenzenesulfonyloxyimino)-benzyl cyanide, α-(4-nitrobenzenesulfonyloxyimino)-benzyl cyanide, α-(4-nitro-2-trifluoromethylbenzenesulfonyloxyimino)-benzyl cyanide, α-(benzenesulfonyloxyimino)-4-chlorobenzyl cyanide, α-(benzenesulfonyloxyimino)-2,4-dichlorobenzyl cyanide, α-(benzenesulfonyloxyimino)-2,6-dichlorobenzyl cyanide, α-(benzenesulfonyloxyimino)-4-methoxybenzyl cyanide, α-(2-chlorobenzenesulfonyloxyimino)-4-methoxybenzyl cyanide, α-(benzenesulfonyloxyimino)-thien-2-yl acetonitrile, α-(4-dodecylbenzenesulfonyloxyimino)benzyl cyanide, α-[(p-toluenesulfonyloxyimino)-4-methoxyphenyl]acetonitrile, α-[(dodecylbenzenesulfonyloxyimino)-4-methoxyphenyl]acetonitrile, α-(tosyloxyimino)-4-thienyl cyanide, α-(methylsulfonyloxyimino)-1-cyclopentenyl acetonitrile, α-(methylsulfonyloxyimino)-1-cyclohexenyl acetonitrile, α-(methylsulfonyloxyimino)-1-cycloheptenyl acetonitrile, α-(methylsulfonyloxyimino)-1-cyclooctenyl acetonitrile, α-(trifluoromethylsulfonyloxyimino)-1-cyclopentenyl acetonitrile, α-(trifluoromethylsulfonyloxyimino)-cyclohexyl acetonitrile, α-(ethylsulfonyloxyimino)-ethyl acetonitrile, α-(propylsulfonyloxyimino)-propyl acetonitrile, α-(cyclohexylsulfonyloxyimino)-cyclopentyl acetonitrile, α-(cyclohexylsulfonyloxyimino)-cyclohexyl acetonitrile, α-(cyclohexylsulfonyloxyimino)-1-cyclopentenyl acetonitrile, α-(ethylsulfonyloxyimino)-1-cyclopentenyl acetonitrile, α-(isopropylsulfonyloxyimino)-1-cyclopentenyl acetonitrile, α-(n-butylsulfonyloxyimino)-1-cyclopentenyl acetonitrile, α-(ethylsulfonyloxyimino)-1-cyclohexenyl acetonitrile, α-(isopropylsulfonyloxyimino)-1-cyclohexenyl acetonitrile, α-(n-butylsulfonyloxyimino)-1-cyclohexenyl acetonitrile, α-(methylsulfonyloxyimino)-phenyl acetonitrile, α-(methylsulfonyloxyimino)-p-methoxyphenyl acetonitrile, α-(trifluoromethylsulfonyloxyimino)-phenyl acetonitrile, α-(trifluoromethylsulfonyloxyimino)-p-methoxyphenyl acetonitrile, α-(ethylsulfonyloxyimino)-p-methoxyphenyl acetonitrile, α-(propylsulfonyloxyimino)-p-methylphenyl acetonitrile, and α-(methylsulfonyloxyimino)-p-bromophenyl acetonitrile.

Further, oxime sulfonate-based acid generators disclosed in Japanese Unexamined Patent Application, First Publication No. Hei 9-208554 (Chemical Formulas 18 and 19 shown in paragraphs [0012] to [0014]) and oxime sulfonate-based acid generators disclosed in International Patent Application 04/074242 (pamphlet) (Examples 1 to 40 described on pages 65 to 85) may be preferably used.

Furthermore, as preferable examples, the following can be exemplified.

[Chemical Formula 38]

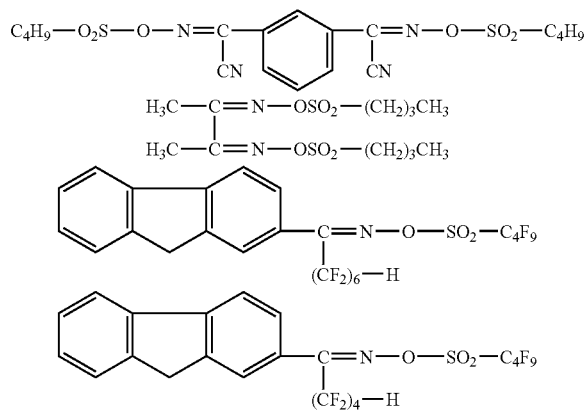

Of the aforementioned diazomethane-based acid generators, specific examples of suitable bisalkyl or bisaryl sulfonyl diazomethanes include bis(isopropylsulfonyl)diazomethane, bis(p-toluenesulfonyl)diazomethane, bis(1,1-dimethylethylsulfonyl)diazomethane, bis(cyclohexylsulfonyl)diazomethane, and bis(2,4-dimethylphenylsulfonyl)diazomethane.

Further, diazomethane-based acid generators disclosed in Japanese Unexamined Patent Application, First Publication No. Hei 11-035551, Japanese Unexamined Patent Application, First Publication No. Hei 11-035552 and Japanese Unexamined Patent Application, First Publication No. Hei 11-035573 may be preferably used.

Furthermore, as poly(bis-sulfonyl)diazomethanes, those disclosed in Japanese Unexamined Patent Application, First Publication No. Hei 11-322707, including 1,3-bis(phenylsulfonyldiazomethylsulfonyl)propane, 1,4-bis(phenylsulfonyldiazomethylsulfonyl)butane, 1,6-bis(phenylsulfonyldiazomethylsulfonyl)hexane, 1,10-bis(phenylsulfonyldiazomethylsulfonyl)decane, 1,2-bis(cyclohexylsulfonyldiazomethylsulfonyl)ethane, 1,3-bis(cyclohexylsulfonyldiazomethylsulfonyl)propane, 1,6-bis(cyclohexylsulfonyldiazomethylsulfonyl)hexane, and 1,10-bis(cyclohexylsulfonyldiazomethylsulfonyl)decane, may be exemplified.

As the component (B), one type of acid generator may be used, or two or more types may be used in combination.

In the present invention, as the component (B), the use of an onium salt-based acid generator containing a fluorinated alkylsulfonate ion that may have a substituent as the anion moiety is preferable.

The total amount of the component (B) within the positive resist composition of the present invention is typically 0.5 to 30 parts by weight, and preferably 1 to 10 parts by weight, relative to 100 parts by weight of the component (A). When the amount of the component (B) is within the above-mentioned range, formation of a resist pattern can be satisfactorily performed. Further, by virtue of the above-mentioned range, a uniform solution can be obtained and the storage stability becomes satisfactory.

<Optional Components>

The positive resist composition of the present invention may also include, as an optional component, a nitrogen-containing organic compound (D) (hereafter, frequently referred to as "component (D)"). Including the component (D) improves the resist pattern shape and the post exposure stability of the latent image formed by the pattern-wise exposure of the resist layer.

A multitude of these components (D) have already been proposed, and any of these known compounds may be used, although an aliphatic amine, and particularly a secondary aliphatic amine or tertiary aliphatic amine is preferable. Here, an "aliphatic amine" refers to an amine having one or more aliphatic groups, and the aliphatic groups preferably have 1 to 12 carbon atoms.

Examples of these aliphatic amines include amines in which at least one hydrogen atom of ammonia ($NH_3$) has been substituted with an alkyl group or hydroxyalkyl group of no more than 12 carbon atoms (namely, alkylamines or alkylalcoholamines), and cyclic amines.

Specific examples of alkylamines and alkylalcoholamines include monoalkylamines such as n-hexylamine, n-heptylamine, n-octylamine, n-nonylamine, and n-decylamine; dialkylamines such as diethylamine, di-n-propylamine, di-n-heptylamine, di-n-octylamine, and dicyclohexylamine; trialkylamines such as trimethylamine, triethylamine, tri-n-propylamine, tri-n-butylamine, tri-n-pentylamine, tri-n-hexylamine, tri-n-heptylamine, tri-n-octylamine, tri-n-nonylamine, tri-n-decanylamine, and tri-n-dodecylamine; and alkyl alcohol amines such as diethanolamine, triethanolamine, diisopropanolamine, triisopropanolamine, di-n-octanolamine, and tri-n-octanolamine. Among these, trialkylamines of 5 to 10 carbon atoms are preferable, and tri-n-pentylamine is particularly desirable.

Examples of the cyclic amine include heterocyclic compounds containing a nitrogen atom as a hetero atom. The heterocyclic compound may be a monocyclic compound (aliphatic monocyclic amine), or a polycyclic compound (aliphatic polycyclic amine).

Specific examples of the aliphatic monocyclic amine include piperidine, and piperazine.

The aliphatic polycyclic amine preferably has 6 to 10 carbon atoms, and specific examples thereof include 1,5-diazabicyclo[4.3.0]-5-nonene, 1,8-diazabicyclo[5.4.0]-7-undecene, hexamethylenetetramine, and 1,4-diazabicyclo[2.2.2]octane.

These compounds can be used either alone, or in combinations of two or more different compounds.

In the present invention, as the component (D), the use of a trialkylamine of 5 to 10 carbon atoms is preferred.

The component (D) is typically used in an amount within a range from 0.01 to 5.0 parts by weight, relative to 100 parts by weight of the component (A).

Furthermore, in the positive resist composition of the present invention, for preventing any deterioration in sensitivity, and improving the resist pattern shape and the post exposure stability of the latent image formed by the pattern-wise exposure of the resist layer, at least one compound (E) (hereafter referred to as the component (E)) selected from the group consisting of an organic carboxylic acid, or a phosphorus oxo acid or derivative thereof can be added.

Examples of suitable organic carboxylic acids include acetic acid, malonic acid, citric acid, malic acid, succinic acid, benzoic acid, and salicylic acid.

Examples of phosphorus oxo acids include phosphoric acid, phosphonic acid and phosphinic acid. Among these, phosphonic acid is particularly desirable.

Examples of phosphorus oxo acid derivatives include esters in which a hydrogen atom within the above-mentioned oxo acids is substituted with a hydrocarbon group. Examples of the hydrocarbon group include an alkyl group of 1 to 5 carbon atoms and an aryl group of 6 to 15 carbon atoms.

Examples of phosphoric acid derivatives include phosphoric acid esters such as di-n-butyl phosphate and diphenyl phosphate.

Examples of phosphonic acid derivatives include phosphonic acid esters such as dimethyl phosphonate, di-n-butyl phosphonate, phenylphosphonic acid, diphenyl phosphonate and dibenzyl phosphonate.

Examples of phosphinic acid derivatives include phosphinic acid esters such as phenylphosphinic acid.

As the component (E), one type may be used alone, or two or more types may be used in combination.

The component (E) is typically used in an amount within a range from 0.01 to 5.0 parts by weight, relative to 100 parts by weight of the component (A).

If desired, other miscible additives can also be added to the positive resist composition of the present invention. Examples of such miscible additives include additive resins for improving the performance of the resist film, surfactants for improving the applicability, dissolution inhibitors, plasticizers, stabilizers, colorants, halation prevention agents, and dyes.

<Organic Solvent (S)>

The positive resist composition according to the first aspect of the present invention can be prepared by dissolving the materials for the resist composition in an organic solvent (hereafter, frequently referred to as "component (S)").

The component (S) may be any organic solvent which can dissolve the respective components to give a uniform solution, and any one or more kinds of organic solvents can be appropriately selected from those which have been conventionally known as solvents for a chemically amplified resist.

Examples thereof include lactones such as γ-butyrolactone; ketones such as acetone, methyl ethyl ketone, cyclohexanone, methyl-n-pentyl ketone, methyl isopentyl ketone, and 2-heptanone; polyhydric alcohols, such as ethylene glycol, diethylene glycol, propylene glycol and dipropylene glycol; polyhydric alcohol derivatives including compounds with an ester linkage such as ethylene glycol monoacetate, diethylene glycol monoacetate, propylene glycol monoacetate and dipropylene glycol monoacetate, and compounds with an ether linkage including monoalkyl ethers such as the monomethyl ether, monoethyl ether, monopropyl ether or monobutyl ether, or the monophenyl ether of any of the above polyhydric alcohols or the above compounds with an ester linkage [among these, propylene glycol monomethyl ether acetate (PGMEA) and propylene glycol monomethyl ether (PGME) are preferable]; cyclic ethers such as dioxane; esters such as methyl lactate, ethyl lactate (EL), methyl acetate, ethyl acetate, butyl acetate, methyl pyruvate, ethyl pyruvate, methyl methoxypropionate, and ethyl ethoxypropionate; and aromatic organic solvents such as anisole, ethyl benzyl ether, cresyl methyl ether, diphenyl ether, dibenzyl ether, phenetole, butyl phenyl ether, ethylbenzene, diethylbenzene, pentylbenzene, isopropylbenzene, toluene, xylene, cymene and mesitylene.

These solvents can be used individually, or in combination as a mixed solvent.

Among these, PGMEA, PGME and EL are preferable.

Further, a mixed solvent obtained by mixing PGMEA with a polar solvent is preferable. The mixing ratio (weight ratio) of the mixed solvent can be appropriately determined, taking into consideration the compatibility of the PGMEA with the polar solvent, but is preferably in the range of 1:9 to 9:1, and more preferably from 2:8 to 8:2.

Specifically, when EL is mixed as the polar solvent, the PGMEA:EL weight ratio is preferably from 1:9 to 9:1, and more preferably from 2:8 to 8:2. Alternatively, when PGME is mixed as the polar solvent, the PGMEA:PGME is preferably from 1:9 to 9:1, more preferably from 2:8 to 8:2, and still more preferably from 3:7 to 7:3.

Further, as the component (S), a mixed solvent of at least one of PGMEA and EL with γ-butyrolactone is also preferable. The mixing ratio (former:latter) of such a mixed solvent is preferably from 70:30 to 95:5.

The amount of the component (S) is not particularly limited, and is appropriately adjusted to a concentration that enables coating of a coating solution to a substrate, depending on the thickness of the coating film. In general, the organic solvent is used in an amount such that the solid content of the resist composition becomes within the range from 2 to 20% by weight, and preferably from 5 to 15% by weight.

The positive resist composition of the present invention is a novel composition that until now has been unknown.

According to the positive resist composition of the present invention, for example, a resist pattern having reduced line edge roughness (LER) can be formed on a substrate with a high level of resolution.

Here, LER describes roughness within the side wall surfaces of the resist pattern. LER can cause distortions around the holes in hole patterns, and fluctuations in the line width in line and space patterns, and consequently has the potential to adversely affect the formation of very fine semiconductor elements. Improving LER is therefore very desirable.

Further, according to the positive resist composition of the present invention, during formation of a hole pattern, a resist pattern with favorable circularity and removability can be formed.

The reason the above effects are obtained is not entirely clear, but it is thought to be due to the fact that by including the component (A1) containing both the structural unit (a0) and the structural unit (a1), the difference in the solubility within the alkali developing solution of the unexposed portions and the exposed portions (namely, the solubility contrast) is increased dramatically compared with conventional positive resist compositions. In the structural unit (a0), it is thought that because the side chain portion of the structural unit (a0) is long, the terminal acid dissociable, dissolution inhibiting group dissociates readily, thereby improving the dissociation efficiency.

<<Method of Forming Resist Pattern>>

The method of forming a resist pattern according to the present invention includes: forming a resist film on a substrate using the positive resist composition of the present invention described above; conducting exposure of the resist film; and alkali-developing the resist film to form a resist pattern.

The method of forming a resist pattern according to the present invention can be performed, for example, as follows.

Firstly, a resist composition according to the first aspect of the present invention is applied onto a substrate using a spinner or the like, and a prebake (post applied bake (PAB)) is conducted under temperature conditions of 80 to 150° C. for 40 to 120 seconds, preferably 60 to 90 seconds to form a resist film. Then, for example, using an ArF exposure apparatus or the like, the resist film is selectively exposed to an ArF excimer laser beam through a desired mask pattern, followed by post exposure bake (PEB) under temperature conditions of 80 to 150° C. for 40 to 120 seconds, preferably 60 to 90 seconds. Subsequently, developing is conducted using an alkali developing solution such as a 0.1 to 10% by weight aqueous solution of tetramethylammonium hydroxide, preferably followed by rinsing with pure water, and drying. If desired, bake treatment (post bake) can be conducted following the developing. In this manner, a resist pattern that is faithful to the mask pattern can be obtained.

The substrate is not specifically limited and a conventionally known substrate can be used. For example, substrates for electronic components, and such substrates having wiring patterns formed thereon can be exemplified. Specific examples of the material of the substrate include metals such as silicon wafer, copper, chromium, iron and aluminum; and glass. Suitable materials for the wiring pattern include copper, aluminum, nickel, and gold.

Further, as the substrate, any one of the above-exemplified substrates provided with an inorganic and/or organic film on the surface thereof may be used. As the inorganic film, an inorganic antireflection film (inorganic BARC) can be exemplified. As the organic film, an organic antireflection film (organic BARC) can be exemplified.

The wavelength to be used for exposure is not particularly limited and the exposure can be conducted using radiations such as ArF excimer laser, KrF excimer laser, $F_2$ excimer laser, EUV (extreme ultraviolet rays), VUV (vacuum ultraviolet rays), EB (electron beam), X-rays, and soft X-rays. The resist composition of the present invention is effective to KrF excimer laser, ArF excimer laser, EB and EUV, and particularly effective to ArF excimer laser.

Exposure of the resist film may be conducted either by normal exposure within the air or an inert gas such as nitrogen (dry exposure), or by liquid immersion exposure.

As mentioned above, in liquid immersion exposure, the exposure is conducted with the region between the lens and the resist film on the wafer, which is conventionally filled with air or an inert gas such as nitrogen, filled with a solvent (the liquid immersion medium) that has a larger refractive index than the refractive index of air.

Specifically, in liquid immersion exposure, the region between the resist film obtained in the manner described above and the lens at the lowermost point of the exposure apparatus is pre-filled with a solvent (the liquid immersion medium) that has a larger refractive index than the refractive index of air, and exposure (liquid immersion exposure) is then conducted in this state, through a desired mask pattern.

As the liquid immersion medium, a solvent having a refractive index that is larger than the refractive index of air but smaller than the refractive index of the resist film undergoing exposure by the liquid immersion exposure is preferable. There are no other particular limitations on the refractive index of the solvent as long as it falls within the above range.

Examples of solvents having a refractive index that is larger than the refractive index of air but smaller than the refractive index of the resist film include water, fluorine-based inert liquids, silicon-based solvents, and hydrocarbon-based solvents.

Specific examples of the fluorine-based inert liquids include liquids containing a fluorine-based compound such as $C_3HCl_2F_5$, $C_4F_9OCH_3$, $C_4F_9OC_2H_5$ or $C_5H_3F_7$ as the primary component, and the boiling point of the liquid is preferably within a range from 70 to 180° C., and more preferably from 80 to 160° C. Provided the fluorine-based inert liquid has a boiling point within the above-mentioned range, removal of the immersion medium following completion of the exposure can be conducted using a simple method, which is preferable.

As the fluorine-based inert liquid, perfluoroalkyl compounds in which all of the hydrogen atoms of an alkyl group have been substituted with fluorine atoms are preferred. More specific examples of these perfluoroalkyl compounds include perfluoroalkylether compounds and perfluoroalkylamine compounds.

Specifically, one example of a suitable perfluoroalkylether compound is perfluoro(2-butyl-tetrahydrofuran) (boiling point: 102° C.), and an example of a suitable perfluoroalkylamine compound is perfluorotributylamine (boiling point: 174° C.).

EXAMPLES

As follows is a more detailed description of the present invention based on a series of examples, although the scope of the present invention is in no way limited by these examples.

Examples 1 and 2

Comparative Examples 1 and 2

Synthesis of Polymer Compounds

Using the compounds (1) to (5) shown below, polymer compounds (1) to (4) were synthesized via the synthesis examples described below.

For each of the obtained polymer compounds (1) to (4), the polymer composition (molar ratio), the weight average molecular weight (Mw), and the dispersity (Mw/Mn) are shown in Table 1.

[Chemical Formula 39]

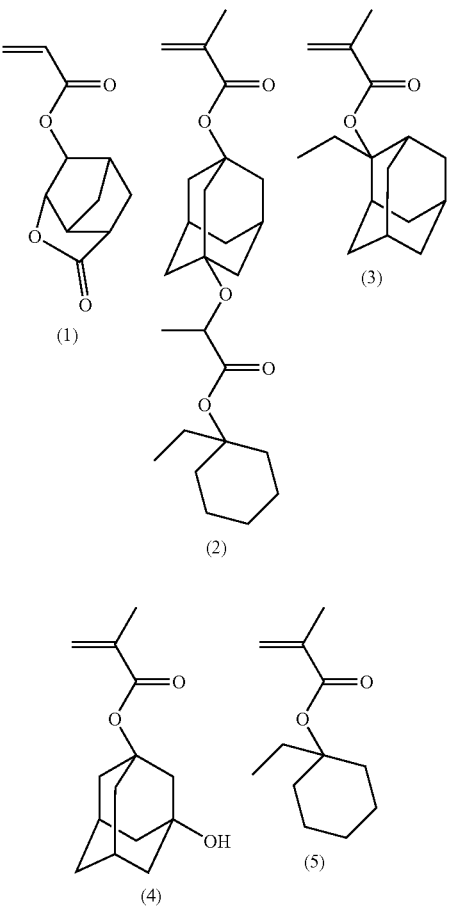

Example 1

Synthesis of the Polymer Compound (1)

7.90 g (38.0 mmol) of the compound (1), 5.96 g (14.25 mmol) of the compound (2), 5.89 g (23.75 mmol) of the compound (3), and 4.48 g (19.0 mmol) of the compound (4) were dissolved in 96.92 g of methyl ethyl ketone. To this solution was added and dissolved 9.50 mmol of V-601 (a trade name) (a radical polymerization initiator: dimethyl 2,2'-azobis(2-methylpropionate)) manufactured by Wako Pure Chemical Industries, Ltd. The resulting solution was added dropwise, over a period of 6 hours and under an atmosphere of nitrogen, to 40.38 g of methyl ethyl ketone heated to 75° C. Following completion of the dropwise addition, the reaction solution was stirred under heating for one hour, and then cooled to room temperature. Subsequently, the reaction solution was dripped into a large quantity of a methanol/water mixed solution, and the operation of precipitating the reaction product was conducted twice. The thus obtained reaction product was dried at room temperature under reduced pressure and yielded a white powder.

The obtained reaction product is termed polymer compound (1). The structural formula of the compound is shown below.

A carbon-13 nuclear magnetic resonance spectrum (600 MHz $^{13}$C-NMR) of this polymer compound (1) was measured at 600 MHz and used to determine the polymer composition (the ratio a2/a0/a1/a3 (molar ratio) between each of the structural units within the structural formula). Further, a GPC measurement was used to determine the polystyrene equivalent weight average molecular weight (Mw) and the dispersity (Mw/Mn).

From these results it was evident that the obtained polymer compound (1) was a copolymer of the compound (1), the compound (2), the compound (3) and the compound (4).

[Chemical Formula 40]

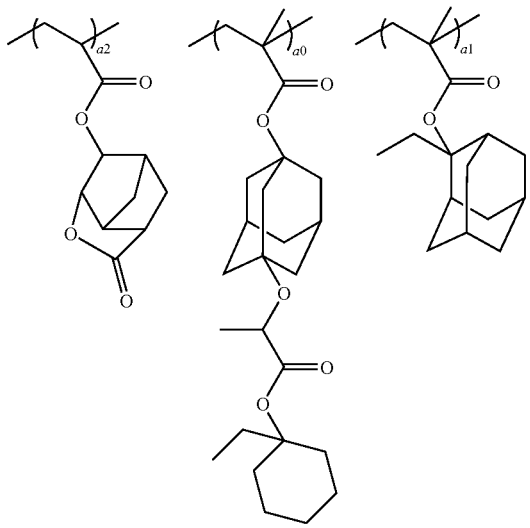

-continued

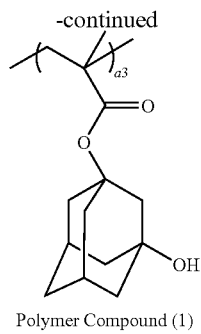

Polymer Compound (1)

Example 2

Synthesis of the Polymer Compound (2)

7.90 g (38.0 mmol) of the compound (1), 9.93 g (23.75 mmol) of the compound (2), 3.53 g (14.25 mmol) of the compound (3), and 4.48 g (19.0 mmol) of the compound (4) were dissolved in 103.36 g of methyl ethyl ketone.

To this solution was added and dissolved 9.50 mmol of V-601 (a trade name) (a radical polymerization initiator) manufactured by Wako Pure Chemical Industries, Ltd. The resulting solution was added dropwise, over a period of 6 hours and under an atmosphere of nitrogen, to 43.07 g of methyl ethyl ketone heated to 75° C. Following completion of the dropwise addition, the reaction solution was stirred under heating for one hour, and then cooled to room temperature. Subsequently, the reaction solution was dripped into a large quantity of a methanol/water mixed solution, and the operation of precipitating the reaction product was conducted twice. The thus obtained reaction product was dried at room temperature under reduced pressure and yielded a white powder.

The obtained reaction product is termed polymer compound (2). The structural formula of the compound is shown below.

For the polymer compound (2), the polymer composition (the ratio a2/a0/a1/a3 (molar ratio) between each of the structural units within the structural formula), the weight average molecular weight (Mw) and the dispersity (Mw/Mn) were measured using the same methods as those described above.

From these results it was evident that the obtained polymer compound (2) was a copolymer of the compound (1), the compound (2), the compound (3) and the compound (4).

[Chemical Formula 41]

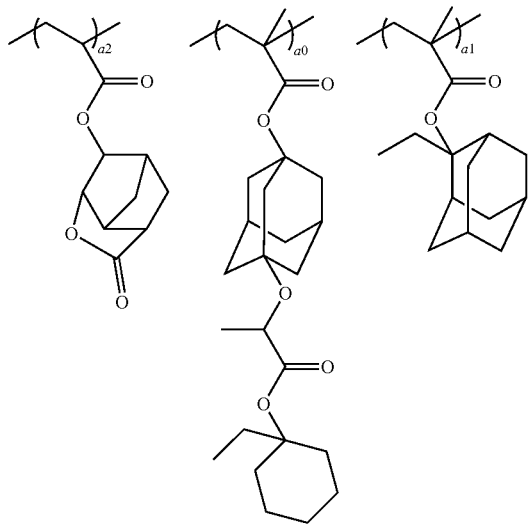

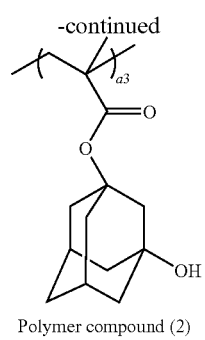

Polymer compound (2)

Comparative Example 1

Synthesis of the Polymer Compound (3)

7.90 g (38.0 mmol) of the compound (1), 15.88 g (38.0 mmol) of the compound (2), and 4.48 g (19.0 mmol) of the compound (4) were dissolved in 113.04 g of methyl ethyl ketone. To this solution was added and dissolved 12.35 mmol of V-601 (a trade name) (a radical polymerization initiator) manufactured by Wako Pure Chemical Industries, Ltd. The resulting solution was added dropwise, over a period of 6 hours and under an atmosphere of nitrogen, to 47.10 g of methyl ethyl ketone heated to 75° C. Following completion of the dropwise addition, the reaction solution was stirred under heating for one hour, and then cooled to room temperature. Subsequently, the reaction solution was dripped into a large quantity of a methanol/water mixed solution, and the operation of precipitating the reaction product was conducted twice. The thus obtained reaction product was dried at room temperature under reduced pressure and yielded a white powder.

The obtained reaction product is termed polymer compound (3). The structural formula of the compound is shown below.

For the polymer compound (3), the polymer composition (the ratio a2/a0/a3 (molar ratio) between each of the structural units within the structural formula), the weight average molecular weight (Mw) and the dispersity (Mw/Mn) were measured using the same methods as those described above.

From these results it was evident that the obtained polymer compound (3) was a copolymer of the compound (1), the compound (2) and the compound (4).

[Chemical Formula 42]

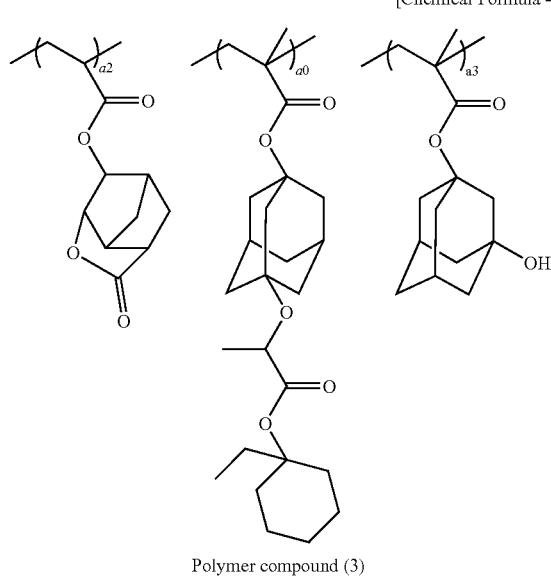

Polymer compound (3)

Comparative Example 2

Synthesis of the Polymer Compound (4)

7.90 g (38.0 mmol) of the compound (1), 7.45 g (38.0 mmol) of the compound (5), and 4.48 g (19.0 mmol) of the compound (4) were dissolved in 79.32 g of methyl ethyl ketone. To this solution was added and dissolved 14.25 mmol of V-601 (a trade name) (a radical polymerization initiator) manufactured by Wako Pure Chemical Industries, Ltd. The resulting solution was added dropwise, over a period of 6 hours and under an atmosphere of nitrogen, to 33.05 g of methyl ethyl ketone heated to 75° C. Following completion of the dropwise addition, the reaction solution was stirred under heating for one hour, and then cooled to room temperature. Subsequently, the reaction solution was dripped into a large quantity of a methanol/water mixed solution, and the operation of precipitating the reaction product was conducted twice. The thus obtained reaction product was dried at room temperature under reduced pressure and yielded a white powder.

The obtained reaction product is termed polymer compound (4). The structural formula of the compound is shown below.

For the polymer compound (4), the polymer composition (the ratio a2/a1/a3 (molar ratio) between each of the structural units within the structural formula), the weight average molecular weight (Mw) and the dispersity (Mw/Mn) were measured using the same methods as those described above.

From these results it was evident that the obtained polymer compound (4) was a copolymer of the compound (1), the compound (5) and the compound (4).

[Chemical Formula 43]

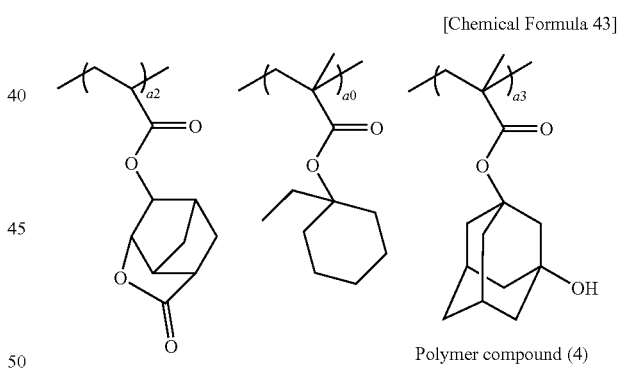

Polymer compound (4)

TABLE 1

| | | a2 | a0 | a1 | a3 | Mw | Mw/Mn |
|---|---|---|---|---|---|---|---|
| Example 1 | Polymer compound (1) | 41.0 | 16.1 | 22.4 | 20.5 | 8,300 | 1.49 |
| Example 2 | Polymer compound (2) | 40.2 | 26.1 | 13.3 | 20.4 | 12,400 | 1.49 |
| Comparative example 1 | Polymer compound (3) | 39.3 | 41.3 | — | 19.4 | 6,400 | 1.73 |
| Comparative example 2 | Polymer compound (4) | 44.6 | — | 34.8 | 20.6 | 7,200 | 1.76 |

Examples 3 and 4

Comparative Examples 3 and 4

Preparation of Resist Compositions

The components shown in Table 2 were mixed together and dissolved, yielding a series of positive resist compositions.

TABLE 2

|  | Component (A) | Component (B) | Component (D) | Component (S) | |
|---|---|---|---|---|---|
| Example 3 | (A)-1 [100] | (B)-1 [4.87] | (D)-1 [0.1] | (S)-1 [1200] | (S)-2 [800] |
| Example 4 | (A)-2 [100] | (B)-1 [4.87] | (D)-1 [0.1] | (S)-1 [1200] | (S)-2 [800] |
| Comparative example 3 | (A)-3 [100] | (B)-1 [4.87] | (D)-1 [0.1] | (S)-1 [1200] | (S)-2 [800] |
| Comparative example 4 | (A)-4 [100] | (B)-1 [4.87] | (D)-1 [0.1] | (S)-1 [1200] | (S)-2 [800] |

In Table 2, the meaning of each abbreviation is shown below. The numerical values inside the brackets [ ] represent blend quantities (parts by weight).
(A)-1: the above-mentioned polymer compound (1)
(A)-2: the above-mentioned polymer compound (2)
(A)-3: the above-mentioned polymer compound (3)
(A)-4: the above-mentioned polymer compound (4)
(B-1): an acid generator represented by Structural Formula (B)-1 shown below
(D)-1: tri-n-pentylamine
(S)-1: PGMEA
(S)-2: PGME

[Chemical Formula 44]

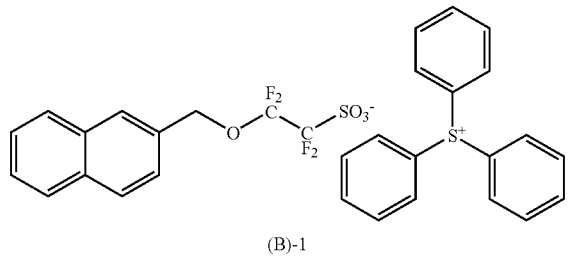

(B)-1

The acid generator represented by the above Structural Formula (B)-1 was obtained using the method outline below.

Namely, 6.99 g of triphenylsulfonium bromide was dissolved in 125 ml of pure water, 5.50 g of the lithium salt of 2-naphthylmethyloxytetrafluoroethanesulfonic acid was added to the solution, and the resulting mixture was stirred for 19 hours at room temperature. Subsequently, 125 g of dichloromethane was added to the solution and mixed, and the organic phase was then separated and collected. This organic phase was washed with 40 ml of pure water, and the organic phase was once again separated, and was then concentrated and dried, yielding the acid generator represented by Structural Formula (B)-1.

<Evaluation of Lithography Properties>

Using the obtained positive resist composition solutions, the following lithography properties were evaluated.

[Resolution and Sensitivity]

An organic anti-reflection film composition (product name: ARC-29, manufactured by Brewer Science Ltd.) was applied onto an 8-inch silicon wafer using a spinner, and the composition was then baked and dried on a hotplate at 205° C. for 60 seconds, thereby forming an organic anti-reflection film having a film thickness of 89 nm. Then, the positive resist composition obtained above was applied onto the anti-reflection film using a spinner, and was then prebaked (PAB) on a hotplate at 100° C. for 60 seconds and dried, thereby forming a resist film having a film thickness of 120 nm.

Subsequently, a protective film-forming coating liquid (product name: TSRC-002, manufactured by Tokyo Ohka Kogyo Co., Ltd.) was applied onto the resist film using a spinner, and was then heated at 90° C. for 60 seconds, thereby forming a top coat having a film thickness of 28 nm.

Subsequently, the resist film with the top coat formed thereon was selectively irradiated with an ArF excimer laser (193 nm) through a mask pattern (a 6% halftone mask), using a liquid immersion ArF exposure apparatus NSR-S609B (a product name, manufactured by Nikon Corporation, NA (numerical aperture)=1.07, 2/3 annular illumination, reduction ratio: 1/4, liquid immersion medium: water).

Subsequently, a protective film removal liquid (product name: TS-Remover-S, manufactured by Tokyo Ohka Kogyo Co., Ltd.) was used to remove the top coat, and a PEB treatment was then conducted at 95° C. for 60 seconds, followed by development for 30 seconds at 23° C. in a 2.38% by weight aqueous solution of TMAH (product name: NMD-W, manufactured by Tokyo Ohka Kogyo Co., Ltd.). Then, the resist was rinsed for 30 seconds with pure water, followed by drying by shaking.

As a result, in each example, a resist pattern was formed in the resist film having a contact hole pattern in which holes with a hole diameter of 70 nm were positioned with equal spacing (pitch: 131.5 nm).

The optimum exposure dose Eop (mJ/cm$^2$; the sensitivity) for formation of the contact hole pattern with a hole diameter of 70 nm and a pitch of 131.5 nm was determined. The results are shown in Table 3.

[Circularity]

The formed contact hole pattern having a hole diameter of 70 nm and a pitch of 131.5 nm was observed from above using a scanning electron microscope SEM, and the circularity of the hole pattern was evaluated against the following criteria. The results are shown in Table 3.

TABLE 3

|  | Eop (mJ/cm2) | Circularity |
|---|---|---|
| Example 3 | 22 | A |
| Example 4 | 41 | A |
| Comparative example 3 | 40 | B |
| Comparative example 4 | 47 | B |

A: a high degree of circularity
B: a low degree of circularity

As is evident from the above results, the positive resist compositions of Examples 3 and 4 that contained a polymer compound according to the present invention exhibited a higher degree of circularity for the hole pattern than either of the compositions of Comparative Examples 3 and 4 that contained a polymer compound different from that of the present invention, confirming that the compositions of the present invention exhibit excellent resolution. Further, in the positive resist compositions of Examples 3 and 4, the pattern removability was also superior to that of Comparative Examples 3 and 4.

Furthermore, the positive resist composition of Example 3 exhibited a particularly favorable level of resolution.

The present invention provides a novel polymer compound that can be used as the resin component of a positive resist composition, a positive resist composition that includes the polymer compound, and a method of forming a resist pattern that uses the positive resist composition, and is therefore extremely useful industrially.

What is claimed is:

1. A polymer compound, having a structural unit (a0) represented by a general formula (a0-1) shown below, and a structural unit (a1) that is derived from an acrylate ester containing an acid dissociable, dissolution inhibiting group but is not classified as said structural unit (a0):

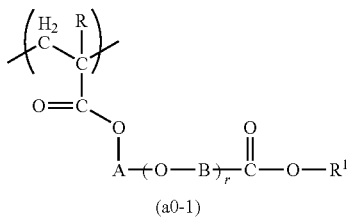

(a0-1)

[wherein, R represents a hydrogen atom, a lower alkyl group, or a halogenated lower alkyl group; A represents a divalent aliphatic cyclic group that may have a substituent; B represents a divalent hydrocarbon group that may have a substituent; r represents an integer of 1; and $R^1$ represents an acid dissociable, dissolution inhibiting group].

2. A polymer compound according to claim 1, further having a structural unit (a2) derived from an acrylate ester that contains a lactone-containing cyclic group.

3. A polymer compound according to claim 1, further having a structural unit (a3) derived from an acrylate ester that contains a polar group-containing aliphatic hydrocarbon group.

4. A positive resist composition, comprising a resin component (A) that exhibits increased solubility in an alkali developing solution under action of acid, and an acid generator component (B) that generates acid upon exposure, wherein
said resin component (A) comprises a polymer compound (A1) having a structural unit (a0) represented by a general formula (a0-1) shown below, and a structural unit (a1) that is derived from an acrylate ester containing an acid dissociable, dissolution inhibiting group but is not classified as said structural unit (a0):

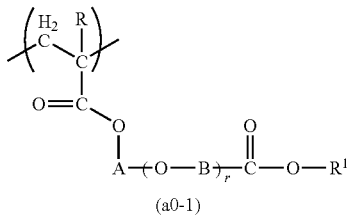

(a0-1)

[wherein, R represents a hydrogen atom, a lower alkyl group, or a halogenated lower alkyl group; A represents a divalent aliphatic cyclic group that may have a substituent; B represents a divalent hydrocarbon group that may have a substituent; r represents an integer of 1; and $R^1$ represents an acid dissociable, dissolution inhibiting group].

5. A positive resist composition according to claim 4, wherein said polymer compound (A1) further has a structural unit (a2) derived from an acrylate ester that contains a lactone-containing cyclic group.

6. A positive resist composition according to claim 4, wherein said polymer compound (A1) further has a structural unit (a3) derived from an acrylate ester that contains a polar group-containing aliphatic hydrocarbon group.

7. A positive resist composition according to claim 4, further comprising a nitrogen-containing organic compound (D).

8. A method of forming a resist pattern, comprising: forming a resist film on a substrate using a positive resist composition according to claim 4; conducting exposure of said resist film; and alkali-developing said resist film to form a resist pattern.

9. A positive resist composition according to claim 4, wherein the acid generator component (B) is a compound represented by General Formula (b-1) or (b-2) shown below:

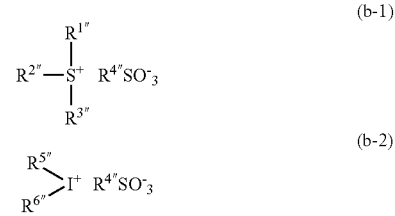

[wherein $R^{1\prime\prime}$ to $R^{3\prime\prime}$, $R^{5\prime\prime}$ and $R^{6\prime\prime}$ each independently represents an aryl group or alkyl group, wherein two of $R^{1\prime\prime}$ to $R^{3\prime\prime}$ in formula (b-1) may be bonded to each other to form a ring with the sulfur atom; and $R^{4\prime\prime}$ represents an alkyl group, halogenated alkyl group, aryl group or alkenyl group that have a substituent represented by $R^5$—O— [wherein, $R^5$ represents a monovalent aromatic organic group, a monovalent aliphatic hydrocarbon group, or a hydroxyalkyl group]; with the proviso that at least one of $R^{1\prime\prime}$ to $R^{3\prime\prime}$ represents an aryl group, and at least one of $R^{5\prime\prime}$ and $R^{6\prime\prime}$ represents an aryl group].

* * * * *